United States Patent
Ryoo et al.

(10) Patent No.: US 10,887,834 B2
(45) Date of Patent: Jan. 5, 2021

(54) METHOD AND DEVICE FOR SAVING POWER FOR TERMINAL

(71) Applicant: Samsung Electronics Co., Ltd., Suwon-si (KR)

(72) Inventors: Sunheui Ryoo, Yongin-si (KR); Jungsoo Jung, Seongnam-si (KR); Rayeon Ahn, Seoul (KR); Sungjin Lee, Bucheon-si (KR); Jiwon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/300,359

(22) PCT Filed: May 12, 2017

(86) PCT No.: PCT/KR2017/004981
§ 371 (c)(1),
(2) Date: Nov. 9, 2018

(87) PCT Pub. No.: WO2017/196146
PCT Pub. Date: Nov. 16, 2017

(65) Prior Publication Data
US 2019/0166553 A1  May 30, 2019

Related U.S. Application Data

(60) Provisional application No. 62/335,265, filed on May 12, 2016.

(51) Int. Cl.
*H04W 52/02* (2009.01)
*H04W 76/27* (2018.01)
(Continued)

(52) U.S. Cl.
CPC ... *H04W 52/0209* (2013.01); *H04W 52/0216* (2013.01); *H04W 74/0833* (2013.01);
(Continued)

(58) Field of Classification Search
CPC ............ H04W 52/00; H04W 52/0209; H04W 52/0216; H04W 76/20; H04W 76/28;
(Continued)

(56) References Cited

U.S. PATENT DOCUMENTS 8,755,318 B2   6/2014   Verger et al.
8,798,615 B2   8/2014   Levy et al.
(Continued)

FOREIGN PATENT DOCUMENTS

KR   10-2014-0107596 A   9/2014
KR   10-2015-0079940 A   7/2015
(Continued)

OTHER PUBLICATIONS

Nokia Networks, "Background Traffic", R2-154144, 3GPP TSG-RAN WG2 Meeting #91bis, Oct. 5-9, 2015, Malmo, Sweden.

*Primary Examiner* — Candal Elpenord
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed are a method for delaying an RRC
(Continued)

connection access, a method for entering in early C-DRX or RRC-inactive state, and the like in order to reduce the power consumption of a terminal.

8 Claims, 23 Drawing Sheets

(51) Int. Cl.
    *H04W 74/08*     (2009.01)
    *H04W 76/28*     (2018.01)
    *H04W 76/20*     (2018.01)

(52) U.S. Cl.
    CPC ............ *H04W 76/20* (2018.02); *H04W 76/27* (2018.02); *H04W 76/28* (2018.02); *Y02D 30/70* (2020.08)

(58) Field of Classification Search
    CPC ... H04W 76/27; H04W 74/0833; Y02D 30/70
    See application file for complete search history.

(56) References Cited

U.S. PATENT DOCUMENTS

| | | | |
|---|---|---|---|
| 9,137,841 B2 | 9/2015 | Johansson et al. | |
| 9,143,977 B2 | 9/2015 | Prakash et al. | |
| 9,232,555 B2 | 1/2016 | Su | |
| 9,237,478 B2 | 1/2016 | Vannithamby et al. | |
| 9,241,308 B2 | 1/2016 | Lu et al. | |
| 2013/0039287 A1* | 2/2013 | Rayavarapu | H04W 76/28 370/329 |
| 2013/0194943 A1 | 8/2013 | Davydov et al. | |
| 2014/0141782 A1 | 5/2014 | Rantala et al. | |
| 2014/0321371 A1* | 10/2014 | Anderson | H04W 76/38 370/329 |
| 2015/0282082 A1 | 10/2015 | Landais et al. | |
| 2015/0319744 A1 | 11/2015 | Jung et al. | |
| 2016/0044488 A1 | 2/2016 | Kim et al. | |
| 2017/0325281 A1* | 11/2017 | Hong | H04W 72/048 |
| 2017/0325282 A1* | 11/2017 | Hong | H04W 36/04 |
| 2017/0339612 A1* | 11/2017 | Quan | H04W 76/27 |
| 2019/0045570 A1* | 2/2019 | Lu | H04W 76/18 |
| 2019/0052435 A1* | 2/2019 | Martin | H04W 4/70 |
| 2019/0124699 A1* | 4/2019 | Yamada | H04L 27/26 |
| 2019/0141776 A1* | 5/2019 | Kim | H04W 76/27 |
| 2020/0260402 A1* | 8/2020 | Adjakple | H04W 92/10 |

FOREIGN PATENT DOCUMENTS

| | | |
|---|---|---|
| WO | 2014/084675 A1 | 6/2014 |
| WO | 2014/148795 A1 | 9/2014 |

* cited by examiner

METHOD AND DEVICE FOR SAVING POWER FOR TERMINAL

TECHNICAL FIELD

The present disclosure relates to a communication system, and more particularly, to a method and a device for saving power consumption of a terminal.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

An RRC state for a wireless communication terminal to transmit and receive data has been conservatively designed in accordance with designs of the voice call oriented previous generations. For example, the terminal maintains a waiting time in an RRC connected state (connected DRX) even if traffic does not arrive for a pre-configured time after reception of the traffic, and this causes severe power consumption. Further, in case of a smart phone user, a keep alive message that is not related to user quality of service (QoS) occurs frequently as data, and if an RRC connection for this is maintained as the present state, the terminal power consumption may become worse.

DISCLOSURE OF INVENTION

Technical Problem

An aspect of the present disclosure proposes a terminal low-power operation configuration and a method for configuring the same, in which a base station operates without creating S1 and terminal context in case where the base station maintains S1 connection, stores the terminal context, and transitions to an RRC connected state in a light connectivity environment, such as an RRC inactive state or an RRC idle state.

Another aspect of the present disclosure proposes a method for QoS requirement characteristics, such as delay for support service types (e.g., eMBB, URLLC, and mMTC) of a 5G communication system, aggregation control operation based on the QoS for services through modem mode control based on information on whether to apply light connectivity and/or smart terminal usage state recognition information, terminal measurement period extension and reduction operation, terminal connection waiting time reduction design through efficient radio tail period shortening, power efficiency improvement through long DRX operation in a terminal connection mode, and terminal power saving.

Solution to Problem

In accordance with an aspect of the present disclosure, an operation method by a terminal in a wireless communication system includes transmitting to a base station UE capability information including at least one of information indicating whether to support a radio resource control (RRC) inactive state and information indicating whether a terminal context stored in the terminal is effective; transmitting terminal information to the base station; and transitioning to the RRC inactive state if a timer determined based on the terminal information expires.

In accordance with another aspect of the present disclosure, an operation method by a base station in a wireless communication system includes receiving from a terminal UE capability information including information indicating whether to support a radio resource control (RRC) inactive state; receiving terminal information from the terminal; and transitioning to the RRC inactive state if a timer determined based on the terminal information expires.

In accordance with still another aspect of the present disclosure, a terminal operating in a wireless communication system includes a transceiver configured to transmit and receive signals with a base station; and a controller configured to control the transceiver to transmit to the base station UE capability information including at least one of information indicating whether to support a radio resource control (RRC) inactive state and information indicating whether a terminal context stored in the terminal is effective, control the transceiver to transmit terminal information to the base station, and control to transition to the RRC inactive state if a timer determined based on the terminal information expires.

In accordance with yet still another aspect of the present disclosure, a base station operating in a wireless communication system includes a transceiver configured to transmit and receive signals with a terminal; and a controller configured to control the transceiver to receive from the terminal UE capability information including at least one of information indicating whether to support a radio resource control (RRC) inactive state and information indicating whether a terminal context stored in the terminal is effective, control the transceiver to receive terminal information from the terminal, and control to transition to the RRC inactive state if a timer determined based on the terminal information expires.

Advantageous Effects of Invention

Through the present disclosure, the terminal minimally maintains the waiting time (i.e., C-DRX and radio tail) in the RRC connected state, and thus the power consumption of the terminal can be reduced. Further, in case of an early terminal autonomous release operation, since data is transmitted without an RRC release message for transitioning the RRC state, related control signaling control burden can be removed, and delay time can be reduced. Further, cost efficiency can be heightened through power consumption reduction of the 5G base station (RU or TRP), and radio resource usage efficiency can be heightened through reduction of peripheral interference between 5G cells.

MODE FOR THE INVENTION

Figure 1:
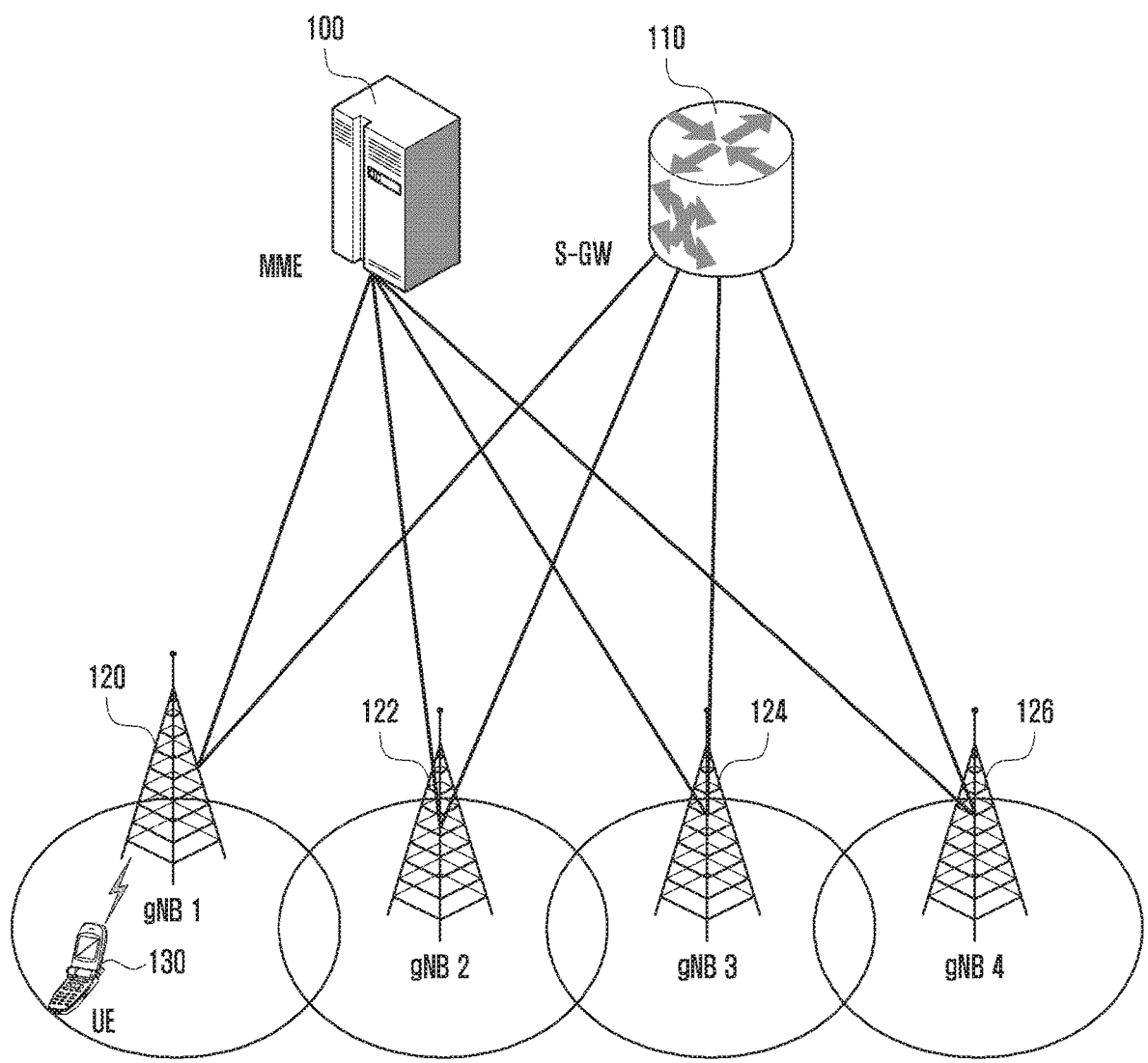
FIG. 1 is a diagram schematically illustrating the structure of a 5G communication system according to an embodiment of the present disclosure.

Hereinafter, embodiments of the present disclosure will be described in detail with reference to the accompanying drawings. In describing the present disclosure, related well-known functions or configurations incorporated herein are not described in detail in case where it is determined that they obscure the subject matter of the present disclosure in unnecessary detail. Further, terms to be described later are terms defined in consideration of their functions in the present disclosure, but may differ depending on intentions of a user and an operator or customs. Accordingly, they should be defined on the basis of the contents of the whole description of the present disclosure.

Further, in describing embodiments of the present disclosure in detail, the primary subject matter of the present disclosure can also be applied to other communication systems having similar technical backgrounds and channel types through slight modifications thereof in a range that does not greatly deviate from the scope of the present disclosure by the judgment of those skilled in the art to which the present disclosure pertains.

The aspects and features of the present disclosure and methods for achieving the aspects and features will be apparent by referring to the embodiments to be described later in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "~units" may be combined into fewer components and "~units" or further separated into additional components and "~units". Further, the components and "~units" may be implemented to operate one or more CPUs in a device or a security multimedia card.

The present disclosure proposes operations of a base station and a terminal, and corresponding devices for achieving energy efficiency KPI that has been discussed in the 3rd Generation Partnership Project (3GPP) radio access network (RAN) 5th generation (5G) communication system standardization process. In the corresponding standards, an energy efficient operation has been defined, primarily taking aim at improvement of power efficiency [bit/J] of a terminal and base station network 1000 times or more within 10 years ahead. For this, in case of a high-frequency band mmWave operation, there has been a discussion on a control method for reducing an active operation time of a terminal to solve possibility of additional power consumption in accordance with an essential beamforming transmission scheme.

An RRC state for a wireless communication terminal to transmit and receive data has been conservatively designed in accordance with designs of the voice call oriented previous generations. For example, the terminal maintains a waiting time in an RRC connected state (connected DRX) even if traffic does not arrive for a pre-configured time after reception of the traffic, and this causes severe power consumption. Further, in case of a smart phone user, a keep alive message that is not related to user quality of service (QoS) occurs frequently as data, and if an RRC connection for this is maintained as the present state, the terminal power consumption may become worse.

The present disclosure proposes an RRC connection control and maintenance method based on three RRC states of connected, inactive, and idle operating in a 5G mobile communication system (it may be mixedly used with new radio (NR)). In particular, the present disclosure describes a method for determining RRC states for data transmission, such as inactive and/or active states, and a method for efficiently transmitting terminal traffic in the RRC inactive state to improve spectral efficiency and to develop a channel access method.

The present disclosure includes an operation method for delaying RRC connection in case of permitting low-power preference or/and service delay as a method for transitioning from an idle (inactive) state to a connected state as an RRC connection management method for low power of a terminal. Further, more specifically, the present disclosure includes a method for performing early C-DRX transitioning, early RRC release, and early terminal autonomous release operations as a method for transitioning from an RRC connected state to an idle (inactive) state. The present disclosure discloses various methods for controlling a terminal or base station modem based on disclosed information that becomes a basis of the method for controlling a terminal or base station modem. Further, the present disclosure discloses a method for operating a DRX cycle by links for dual connection of a terminal in an LTE(MeNB)-NR(SeNB) tight interworking structure.

FIG. 1 is a diagram schematically illustrating the structure of a 5G communication system according to an embodiment of the present disclosure. Referring to FIG. 1, a 5G communication system may include a mobility management entity (MME) 100, a serving gateway (S-GW) 110, and a plurality of gNBs 120, 122, 124, and 126. The gNB is a base station that is connected to UE 130 through a radio channel and performs a more complicated role than the role of the existing NodeB of a UMTS or eNodeB of LTE.

In the 5G communication system, since all user traffics including a real-time service, such as a voice over IP (VoIP) service through an Internet protocol, are provided through a shared channel, devices that perform scheduling through gathering of state information, such as a buffer state of the UE, an available transmission power state, and a channel state, are needed, and the gNBs 120, 122, 124, and 126 take charge of this role. One gNB generally controls a plurality of cells. The S-GW 110 is a device that provides a data bearer, and generates or removes the data bearer in accordance with the control of the MME 100. The MME 100 is a device that takes charge of not only mobility management function of the UE but also various kinds of control functions, and is connected to the plurality of gNBs.

Figure 2:
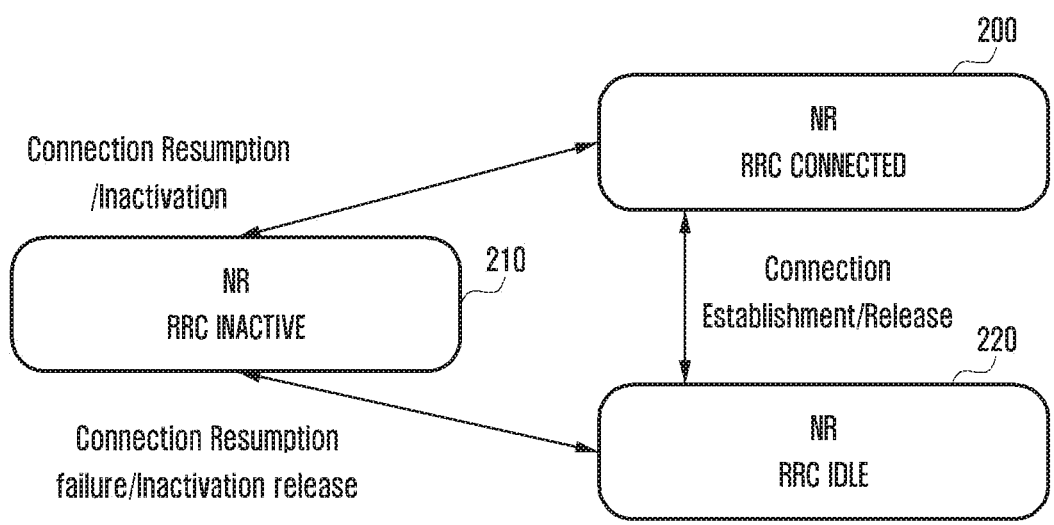
FIG. 2 is a diagram illustrating three RRC states of connected, inactive, and idle states applied in a 5G communication system according to an embodiment of the present disclosure.

FIG. 2 is a diagram illustrating three RRC states of connected, inactive, and idle states applied in a 5G communication system according to an embodiment of the present disclosure. Referring to FIG. 2, in the 5G communication system, a connected state 200, an inactive state 210, and an idle state 220 exist. A 3GPP NR is determined to operate three RRC states through addition of the inactive state to the two existing RRC states, and a terminal may operate as one RRC state at a time. The respective states may be transitioned to different states through procedures of establishment, release, resumption, and inactivation.

Figure 3:
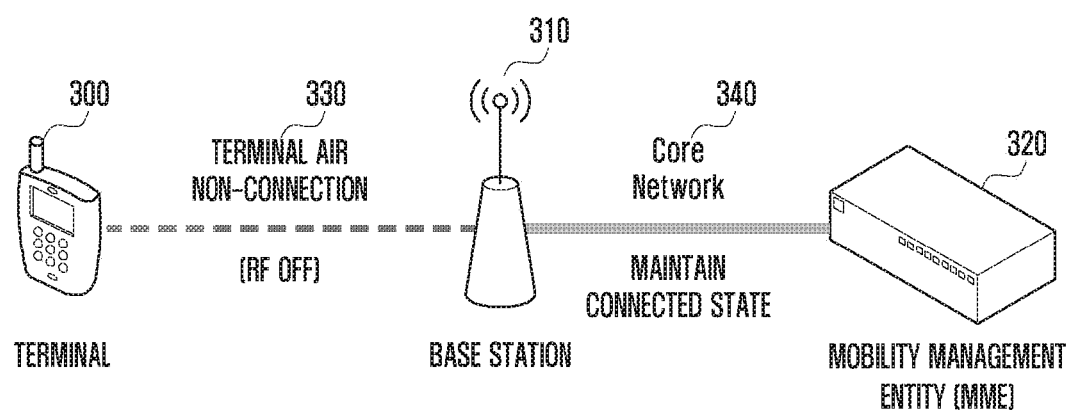
FIG. 3 is a diagram illustrating a terminal in an inactive state and a state of a base station MME in a 5G communication system.

FIG. 3 is a diagram illustrating a terminal in an inactive state and a state of a base station MME in a 5G communication system. It is assumed that in an inactive state that is a new RRC state, an air interface between a terminal 300 and a base station 310 is in an unconnected state (330), and a core network between the base station 310 and an MME 320 maintains a connected state (340). In this case, even if the terminal releases an RRC connected state with the base station, the base station and the MME maintain an ECM connected state, and terminal context is stored in the base station and the MME.

Hereinafter, an RRC state (idle connected state) in C-IoT and NB-IoT technology of 3GPP Release 13 that is the standards in the related art will be described. In order reduce RRC transition delay in the existing RRC idle state, it is necessary to omit an S1 connection establishment and security procedure. For this, an anchor eNB (it can be mixedly used with fixed base station and anchor base station) stores UE context including a resume ID for UE identification. If a terminal in an idle state moves to be connected to a new base station, the terminal transmits the corresponding resume ID for terminal identity, and the base station (the existing base station in case where the terminal is in a standstill state or is located in the same cell, and a new base station in case where the terminal moves) to which the terminal is connected retrieves the UE context based on the resume ID, and then performs a connection procedure.

However, in the C-IoT and NB-IoT of 3GPP Release 13 that is the standards in the related art, since (RRC resume) data is transmitted after the terminal is transitioned to the RRC connected state, a separate DRB establishment for the idle state is not needed. However, a MAC design related to the inactive state is further needed as enhancement for overcome the limit of a CP or UP-solution agreed to NB-IoT. In case of the CP-solution, it is necessary to solve SRB-based MME-gNB load increase problem and delay problem occurring due to transmission of initial small data using a signaling radio bearer (SRB) for NAS security in an idle state and to provide QoS-based discriminatory support. Further, although the UP-solution operates to reduce a burden of CN due to RRC signaling for RRC connection resume and suspend procedure and to minimize the delay, there occurs a problem of waiting power consumption for connected discontinuous reception (C-DRX) since data is transmitted in a connected state.

A method for solving such problems requires the following operations.

First, an inactive state is introduced, and operations, such as aperiodic CQI of an inactive-state terminal operation, BSR-related information, and a new monitoring timer, are added to cope with an idle-based NB-IoT operation. Second, the small data transmission in an inactive state is based on a data ratio bearer (DRB). Through this, it would be possible to solve the SRB-based MME-gNB load increase problem and delay problem and to perform the QoS discriminatory support.

Hereinafter, as an RRC connection management method for low power of a terminal, the present disclosure proposes a method for delaying the RRC connection through random access channel (RACH) delay in case of permitting low-power preference or/and service delay during transitioning from an idle (or inactive) state to a connected state.

Whether to delay the RRC connection may be determined based on the following information.

- Service characteristics: Use case (what type of service, such as eMBB, URLLC, or mMTC, is to be provided), numerology, and TTI
- Terminal characteristics: User attendance and terminal battery state
- Idle mobility: Time required for UE context retrieve may differ in accordance with an anchor base station or not, this may be considered.
- Traffic existence/nonexistence: Whether the traffic is for the purpose of an area update including paging area update (PAU) or tracking area update (TAU), a connection based on uplink (UL) or downlink (DL) traffic, or permission of low-power preference or/and service delay Specifically, first, in case of the service characteristics, the RRC activation for eMBB or mMTC data can perform delay operation in contrast to the URLLC requiring low latency.

Second, due to the characteristics of the terminal, whether a terminal user is unattended is determined based on information, such as OS idle state, device idle state, and display-off, and if the terminal user is unattended, the delay operation may be performed, and this may be determined based on the terminal residual battery state and the low-power preference mode set by the user through the terminal OS.

Third, in case of the idle mobility, if the base station connected by the terminal is the previous base station (i.e., anchor base station) storing the context, the RRC connection may be performed through the delay. This is because if the base station is not the anchor base station, it may take time in retrieving the UE context.

Fourth, in case of the traffic existence/nonexistence, the RRC connection for the paging area (PA) or tracking area (TA) update in accordance with the terminal movement and the RRC connection for traffic transmission are discriminated from each other. If the terminal in an inactive state moves, the terminal in a specific area (in particular, PA) may transition to an RRC connected state when it goes over a PA boundary without reporting to the base station. Further, in case of the RRC connection for supporting idle mobility without data to be actually transmitted and received, the delay operation may be performed. Further, if uplink data occurs during the corresponding delay operation, the terminal can be aware of the uplink data occurrence, and may operate to delay the RRC connection maximally up to the next paging period only for DL paging reception.

Further, as a method for delaying the RRC connection, first is a method for selecting one of grant-free, dedicated, and contention-based RACH based on the base station configuration, and second is a method for determining UL grant delay of the base station based on the terminal feedback.

The name of a message as described hereinafter is exemplary, and in an embodiment of the present disclosure, it can be extended to and analyzed as a message having a similar role to the role of the message disclosed in the embodiment of the present disclosure.

Figure 4:
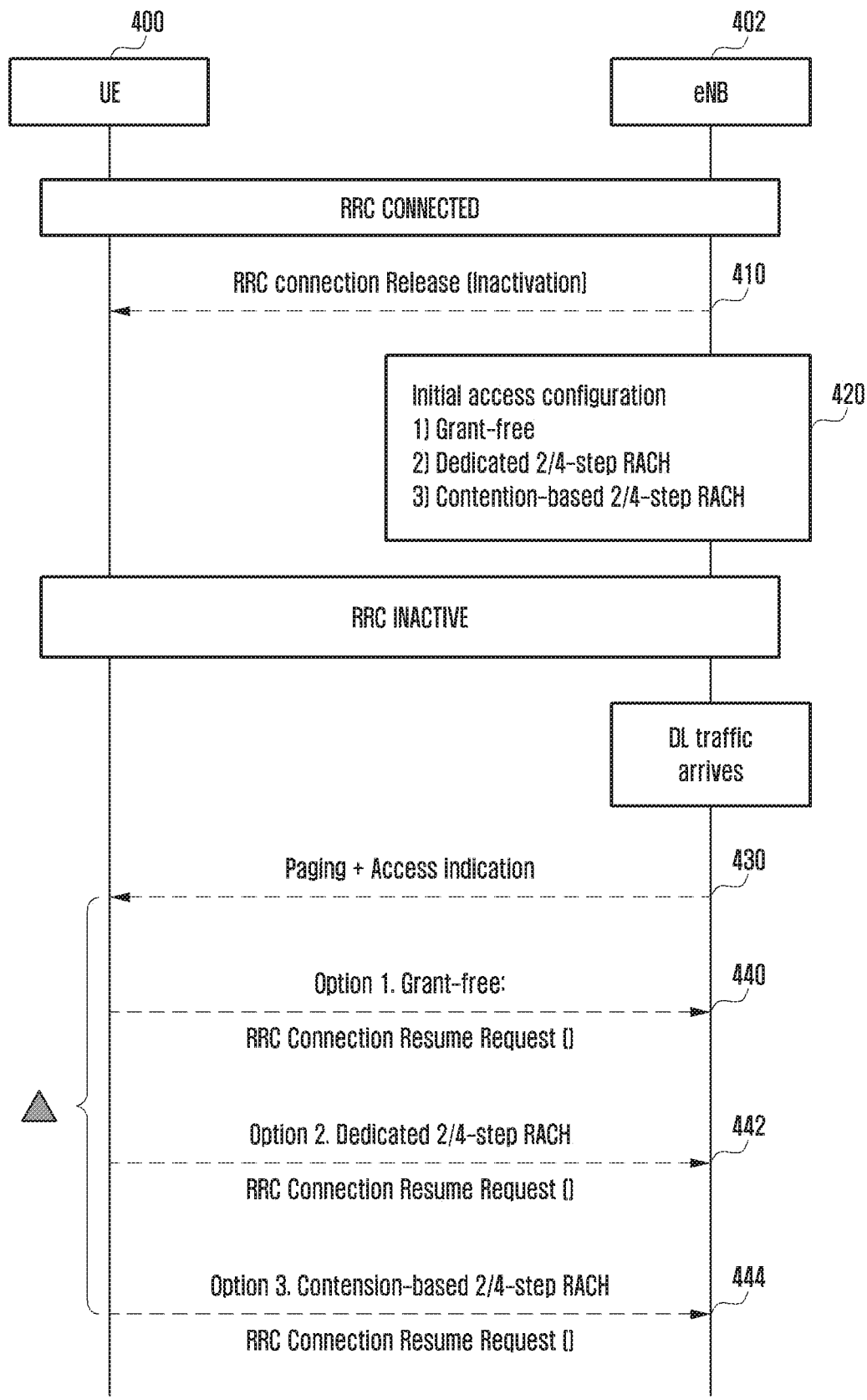
FIG. 4 is a diagram illustrating an example of RRC connection management for low power of a terminal.

FIG. 4 is a diagram illustrating an example of RRC connection management for low power of a terminal Referring to FIG. 4, as a method for transitioning from an idle (or inactive) state to a connected state, grant-free, dedicated 2 or 4-step RACH, contention-based 2 or 4-step RACH operation may be used as an RRC pre-configuration-based RRC connection access control operation after determination of whether to permit low-power preference or/and service delay.

During entering into an inactive state through an RRC connection release (inactivation) message transmitted to a terminal 400 at operation 410, a base station 402 may pre-configure an RRC connection access method. Such an RRC connection access method corresponds to 1) grant-free, 2) dedicated 2 or 4-step RACH, and 3) contention-based 2 or 4-step RACH (420). Such a pre-configuration may also include information on pre-configuration of resources that are necessary to perform the respective methods and information on what RRC connection access method is to be performed by the terminal. The base station may use an operation of transitioning the pre-configuration for one specific transmission mode to be used by the terminal to an inactive state among 1) grant-free, 2) dedicated 2 or 4-step RACH, and 3) contention-based 2 or 4-step RACH. Further, the base station may include an operation method in which the base station configures a plurality of transmission modes to be used by the terminal among 1) grant-free, 2) dedicated 2 or 4-step RACH, and 3) contention-based 2 or 4-step RACH, and configures an event triggering condition for selecting the corresponding transmission mode to the terminal, and the terminal selects the transmission mode based on the corresponding event, and applies related parameters.

Based on this, the base station may notify the terminal what option among 1) grant-free 440, 2) dedicated 2 or 4-step RACH 442, and 3) contention-based 2 or 4-step RACH 444, an RRC access is to be performed in (i.e., in what method, an RRC connection resume request is to be transmitted) through RRC access indication in the process of transmitting a paging message to the terminal when DL traffic arrives (430).

Thereafter, the terminal may select and perform one of 1) grant-free, 2) dedicated 2 or 4-step RACH, and 3) contention-based 2 or 4-step RACH through the RRC access operation based on the received RRC access indication. In this case, since time required for the RRC connection may be lengthened as the operation goes from 1) to 3), the base station may control the connection delay using a method for indicating what method the RRC connection is to be performed in.

Here, for efficiency of radio resource usage, the base station may pre-configure grant-free and dedicated RACH resources to a plurality of terminals, and may control through the RRC access indication included during the paging transmission or through the indication to cause no collision between the terminals.

Figure 5:
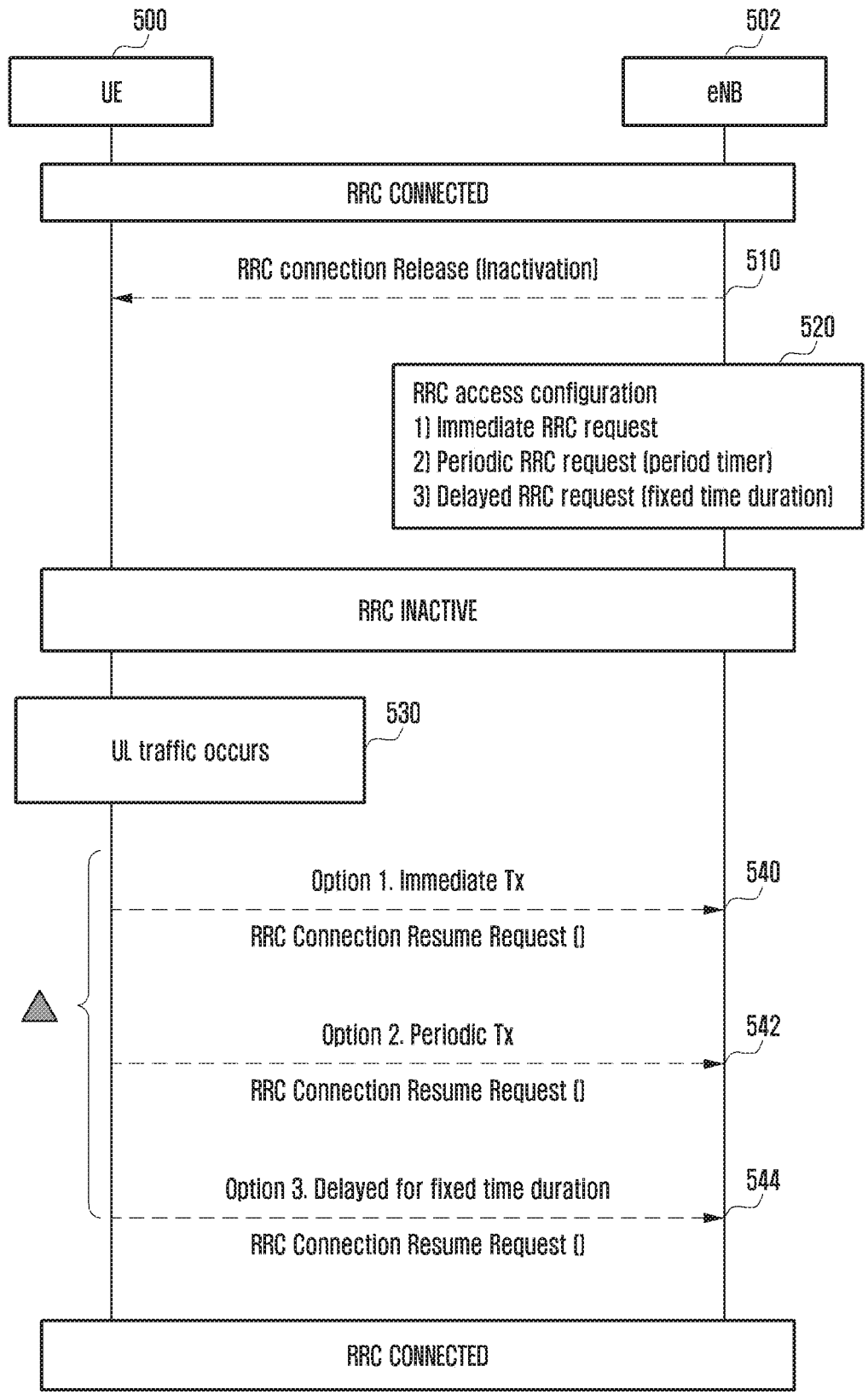
FIG. 5 is a diagram illustrating another example of an RRC connection management method for low power of a terminal.

FIG. 5 is a diagram illustrating another example of an RRC connection management method for low power of a terminal Referring to FIG. 5, as a method for transitioning from an idle (or inactive) state to a connected state, it is determined whether to permit low-power preference or/and service delay, and then, based on this, as an RRC pre-configuration-based RRC connection access control operation, immediate RRC connection transmission procedure start, RRC connection start after a pre-configured time delay after previous transmission, or delayed RRC request (this may be performed for a fixed time duration, and may be configured to, for example, long, mid, or short) may be used.

A base station 502 may pre-configure an RRC connection access method when entering into an inactive state through an RRC connection release (inactivation) message transmitted to a terminal 500 at operation 510. Specifically, the base station may configure a time for transmitting an RRC connection resume request as follows (520).

First, the immediate RRC request 540 is an operation of immediately starting an RRC connection access procedure to satisfy low-latency service requirements, such as URLLC. Second, the periodic RRC request 542 is an operation of starting an RRC connection after a pre-configured time delay after previous transmission. Here, the delay time is controlled by a pre-configured period timer, and may be configured to, for example, long, mid, or short. Third, the delayed RRC request 543 is an option of starting the RRC connection after a pre-configured time delay based on the traffic occurrence time, and the delay time may be configured to, for example, long, mid, or short. In this case, in the first method, the delay time becomes shortest, and the third method has caused the lengthened delay time. Through such connection method configurations, the base station can adjust the RRC connection access delay time.

According to the method for pre-configuring the RRC connection method when the base station enters into the inactive state, the terminal performs the determined RRC connection access without transmitting information (hereinafter, new info.) that becomes the basis of determining whether the terminal permits the low-power preference or service delay (i.e., without being based on the new info.) when the traffic occurs. Accordingly, the terminal selects the RRC connection access method and parameters based on the pre-configuration, and starts transmission of an RRC connection resume request message in accordance with the corresponding configuration.

Figure 6:
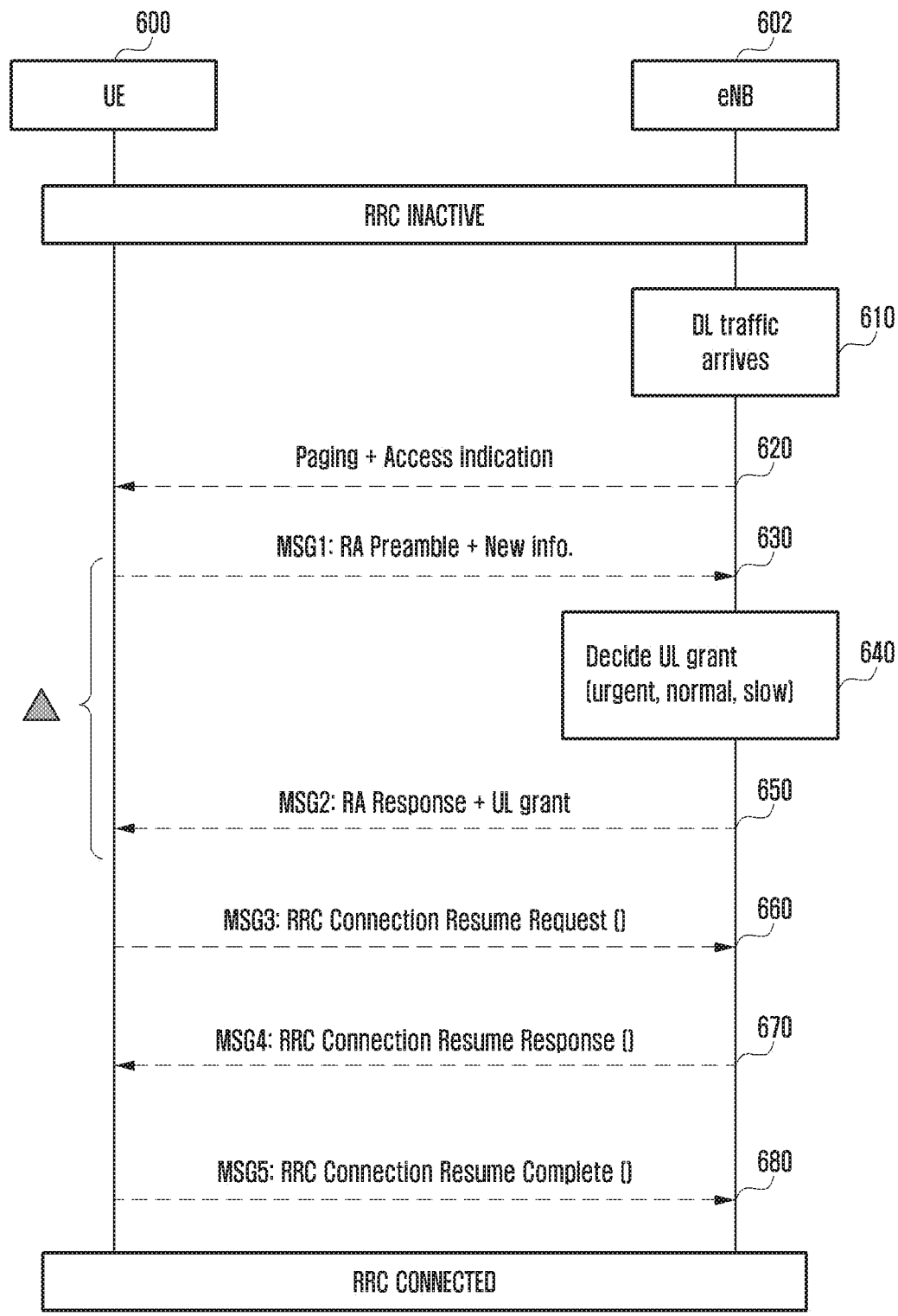
FIG. 6 is a diagram illustrating still another example of an RRC connection management method for low power of a terminal.

FIG. 6 is a diagram illustrating still another example of an RRC connection management method for low power of a terminal. Referring to FIG. 6, as a method for transitioning from an idle (or inactive) state to a connected state, it is determined whether to permit low-power preference or/and service delay, and based on this, as an RRC connection delay method, an RRC connection access control is performed based on UL grant.

When the RRC connection starts due to DL traffic occurrence (610) in an RRC inactive state, a base station 602 transmits a paging message including RRC access indication related information (620).

In this case, during RACH transmission, a terminal 600 may transmit the information (new info.) that becomes the basis of determining whether the terminal permits the low-power preference or service delay being carried on an RA preamble or along with the RA preamble (630). In this case, since only the terminal is aware of the above-described terminal characteristic and idle mobility related information, it is necessary to perform a signaling procedure for transmitting such information to the base station.

The base station discriminates UL grant transmission time and resource for transmitting an RRC connection resume request message (MSG3) through synthesis of the corresponding information, and configures for MSG2 (640). In this case, the UL grant may be configured as one of urgent, normal, and slow. In case of an emergency, the base station immediately transmits MSG2, but in case of no emergency, the base station may transmit the MSG2 after a pre-configured time elapses after reception of the RA preamble. The terminal may start the RRC connection access procedure through transmission of the MSG3 based on the UL grant of the MSG2. Through such a method, the base station may control the RRC connection access delay.

Figure 7:
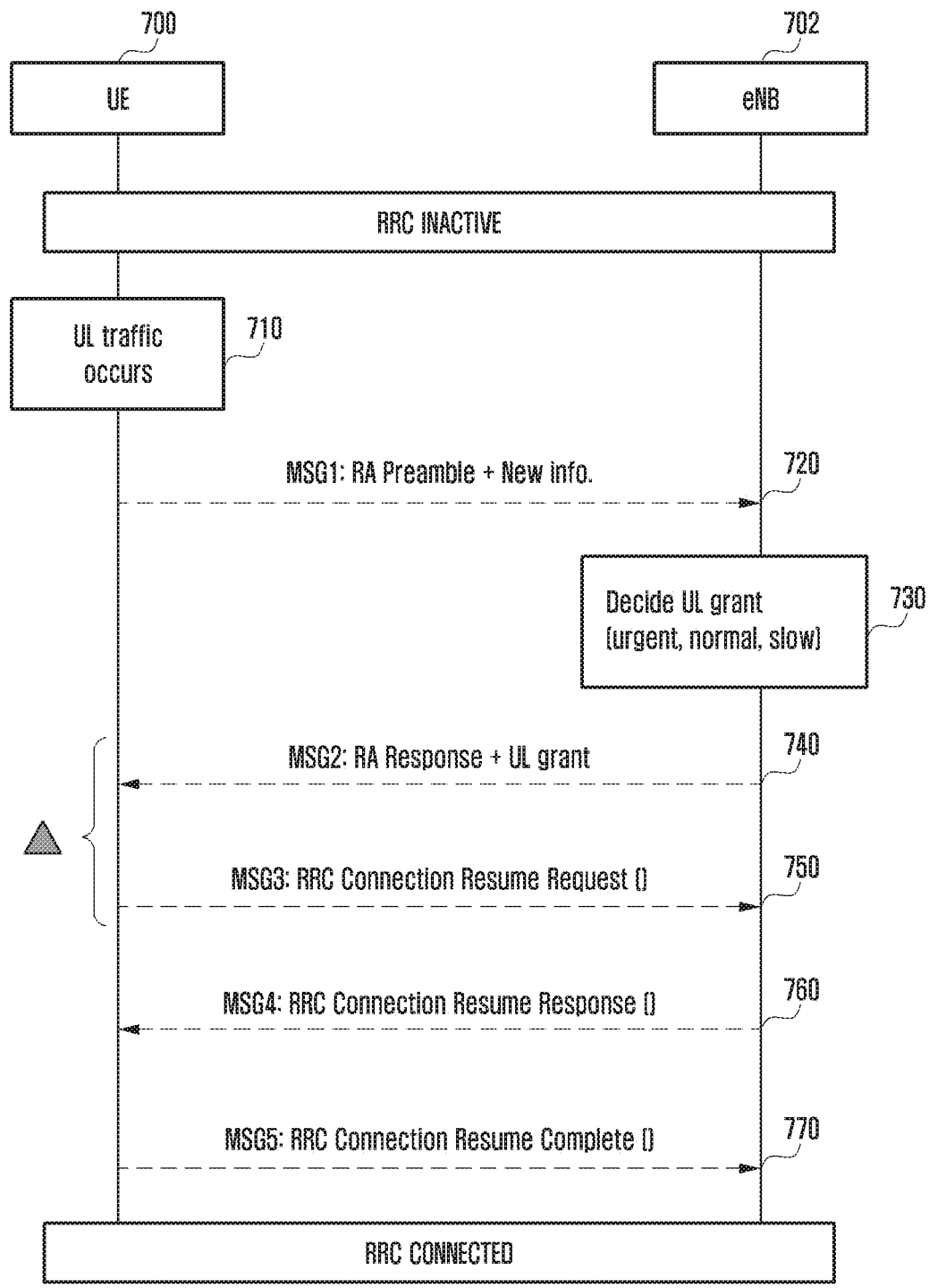
FIG. 7 is a diagram illustrating still another example of an RRC connection management method for low power of a terminal in a communication system according to an embodiment of the present disclosure.

FIG. 7 is a diagram illustrating still another example of an RRC connection management method for low power of a terminal in a communication system according to an embodiment of the present disclosure. Referring to FIG. 7, as a method for transitioning from an idle (or inactive) state to a connected state, it is determined whether to permit low-power preference or/and service delay, and based on this, an RRC connection access control may be performed based on UL grant for RRC connection delay.

If uplink traffic occurs (710), as an RRC access operation, a terminal 700 may include new info. in an RA preamble (MSG1) during RA preamble transmission.

If data intended to be transmitted is uplink traffic, the following information may be provided as new info. The new info. may also include service characteristic information and traffic existence/nonexistence information in addition to the above-described terminal characteristic information and idle mobility information. At a time when an initial RRC connection state is transitioned from an inactive state to a connected state, since the base station is not aware of the information, but only the terminal is aware of the information, there is a need for transmission of the corresponding information to the base station.

Thereafter, the base station 702 having received the information discriminates and configures UL grant time and resource for transmitting an RRC connection resume request message (MSG3) through synthesis of the corresponding information (730), and then includes the same in the MSG2 to be transmitted to the terminal (740).

The method for discriminating and configuring the UL grant time and resource includes, for example, an operation of determining a start time of resources included in the UL grant in accordance with an option corresponding to urgent, normal, or slow, TTI and a sub-carrier (bandwidth). Since the terminal transmits the MSG3 on the resource indicated in the UL grant (750), and the base station determines the transmission time of the MSG3 in accordance with the UL grant, it is possible to control the RRC connection access delay through this.

Figure 8:
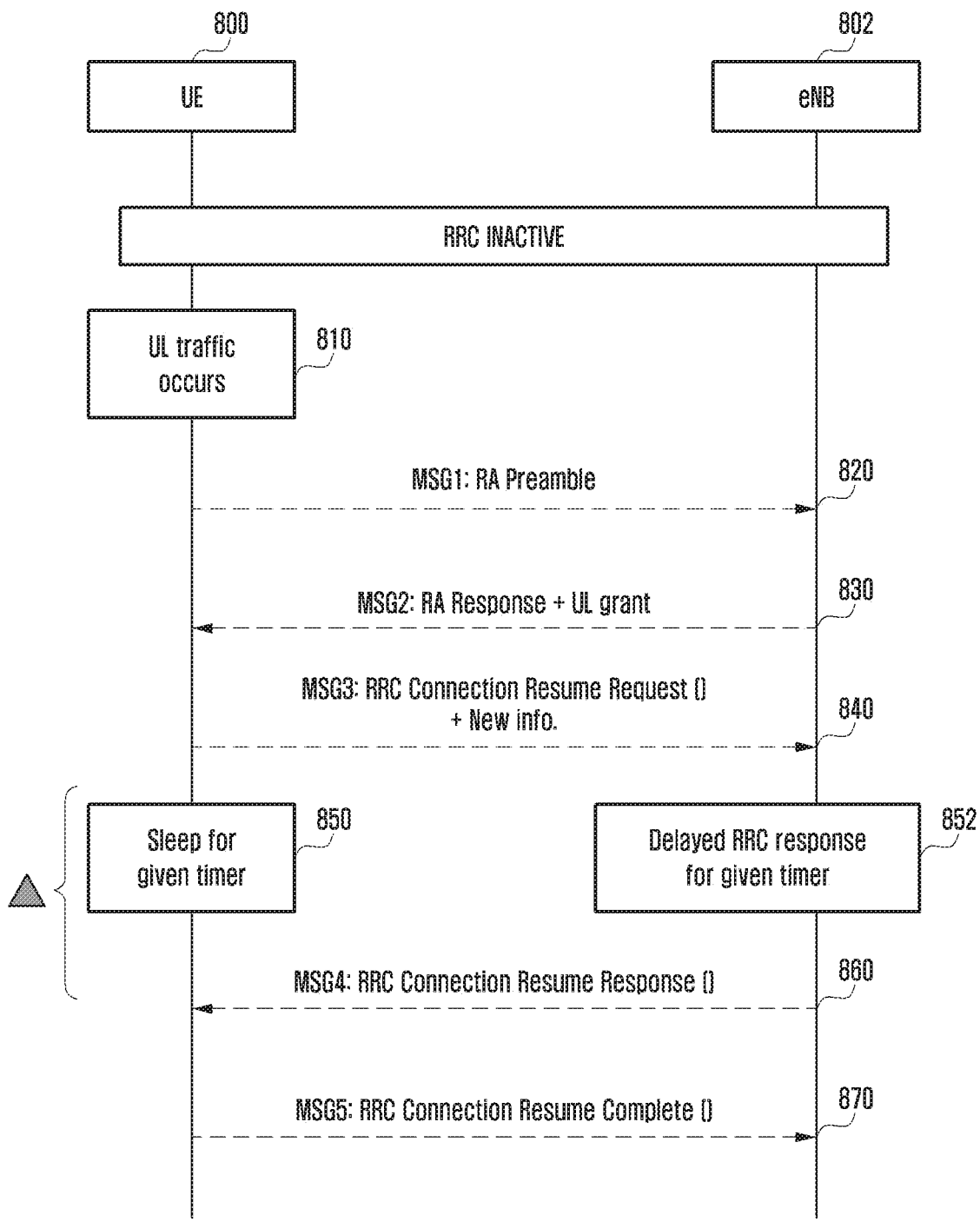
FIG. 8 is a diagram illustrating an example of a method for transmitting terminal information (new info.) in a communication system according to an embodiment of the present disclosure.

FIG. 8 is a diagram illustrating an example of a method for transmitting terminal information (new info.) in a communication system according to an embodiment of the present disclosure. Referring to FIG. 8, terminal information may be transmitted together with an RRC connection resume request message of RACH MSG3.

As a method for transmitting terminal information (new info.) for determining a delay, the following methods may exist.

First, a terminal may not transmit the terminal information. In this case, the terminal may operate in accordance with a pre-configured RRC connection access mode or a mode selected by the terminal. Second, there is a method for transmitting terminal information during MSG1 RA preamble. A method for controlling whether to perform a delay through UL grant of a base station based on the transmitted terminal information has a high degree of freedom of UL grant time and resource configuration of the base station, and should use preamble sequence bits during the transmission, so that it is not possible to transmit a large amount of information. Third, there is a method for including the terminal information in the RRC connection resume request message of MSG3 and transmitting the message including the terminal information. In this method, the base station may transmit an RRC connection response message after a pre-configured time (this may be defined as a timer) elapses, and the terminal may receive the RRC connection response message after the pre-configured time elapses. Since a payload size of MSG3 is larger than the payload size of MSG1, the MSG3 is advantageous in transmitting the terminal information, but only a pre-configured partial timer can be used as a delay time.

If UL traffic occurs (810), a terminal 800 transmits an RA preamble to a base station 802. Thereafter, the base station transmits MSG2 including the UL grant to the terminal (830), and the terminal transmits MSG3 including the terminal information to the base station (840). Based on the information, the base station and the terminal determine a delay time, respectively, and after the delay time, they transmit and receive the RRC connection resume response message, respectively (860). Through this, the delay time can be controlled during the RRC connection access.

Hereinafter, as a method for transitioning from an RRC connected state to an idle (or inactive) state, early C-DRX transitioning, early RRC release, and early terminal autonomous release operations will be described.

The above-described operations may be determined based on the following information.

Last traffic characteristics: Use case (what service among eMBB, URLLC, and mMTC is to be provided), numerology, and TTI Terminal characteristics: User attendance and terminal battery state Terminal/base station inactive support/non-support: S1 connection/disconnection and UE context storage/non-storage Idle mobility: It is determined whether to permit low-power preference or/and service delay in accordance with parameter configuration related to RAN-based paging.

Specifically, first, in case of the last traffic characteristics, for example, since there is a high possibility that the traffic which is similar to the previously supported service is continuously serviced, an early RRC state transition is not performed in case of the URLLC requiring low delay, whereas an early RRC inactivation operation can be supported in case of eMBB or mMTC data. Second, in case of the terminal characteristics, as a determination operation based on the user attendance and terminal battery state, it is determined whether a terminal user is unattended based on an OS idle state, device idle state, and display-off, and if the terminal user is unattended, an early RRC state transitioning is performed, and if the terminal residual battery is low or if a user configures the low-power preference mode through the terminal OS, the RRC connection state is changed. This method may perform early C-DRX transitioning, early RRC release, and early terminal autonomous release operations. Third, in case of the network configuration, if the above-described function is supported in accordance with S1 connection/disconnection, UE context storage/non-storage, terminal and base station (inactive and light connectivity) support/non-support, and UE context storage and retrieve (recovery) normal/abnormal operation, an early RRC inactivation operation can be performed. This is because if the above-described function is supported even in case of the RRC inactivation, the connection state can be rapidly retrieved. Fourth, in case of the idle mobility, during the RAN-based paging, in case of operating a paging area for each UE in a UE-specific cell list, rather than in case of configuring the paging area based on a network or in case of the same paging area regardless of the terminal, PA configuration is possible to an anchor base station in which the UE context is stored and a base station having a short connection delay through an X2 (or Xn) interface, and thus UE context retrieve (recovery) time may be relatively short to make it possible to operate the early RRC state transitioning.

Figure 9:
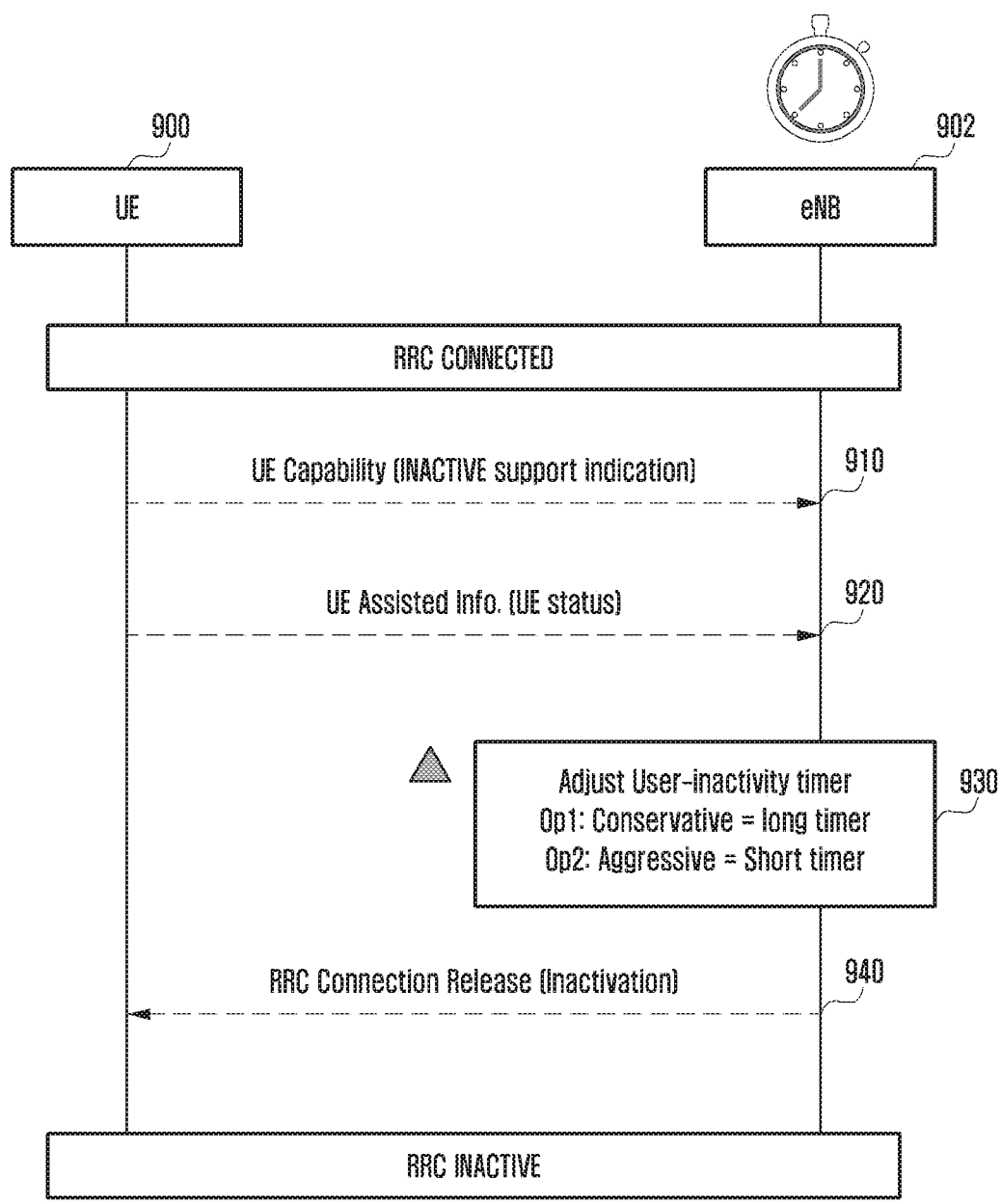
FIG. 9 is a diagram illustrating an example of a method for transitioning from an RRC connected state to an idle (or inactive) state.

FIG. 9 is a diagram illustrating an example of a method for transitioning from an RRC connected state to an idle (or inactive) state. Referring to FIG. 9, early RRC connection release (inactivation) operation may be performed through explicit RRC signaling.

During an initial connection between a terminal and a base station, the terminal 900 transmits to the base station 902 a UE capability message including information indicating whether to support an inactive state operation of the terminal (910). Further, the terminal 900 may report the terminal characteristics (e.g., user attendance and terminal battery state information, hereinafter terminal information) through UE assisted information during the RRC connection (920).

The base station may perform an operation of explicitly configuring the RRC connection state. This operation is performed based on base station possession information, and the base station possession information may be, for example, last traffic characteristic information, base station inactive state operation support/non-support, and RAN-based paging configuration information. Based on the information as described above, the base station may configure a user-inactivity timer (930), and after expiration of the corresponding timer, the base station may explicitly transmit an RRC inactivation message to the terminal (940) to transition to the inactive state.

In this case, if the base station conservatively configures the user-inactivity timer, the base station may operate to reduce delay of the RRC connection state and network configuration control burden instead of consuming the terminal power through configuration of a long timer value. In contrast, in case of actively configuring the user-inactivity timer, the base station may operate to increase the delay of the RRC connection state and to partially increase the network configuration control burden for low-power performance efficiency of the terminal through configuration of a short timer value.

Figure 10:
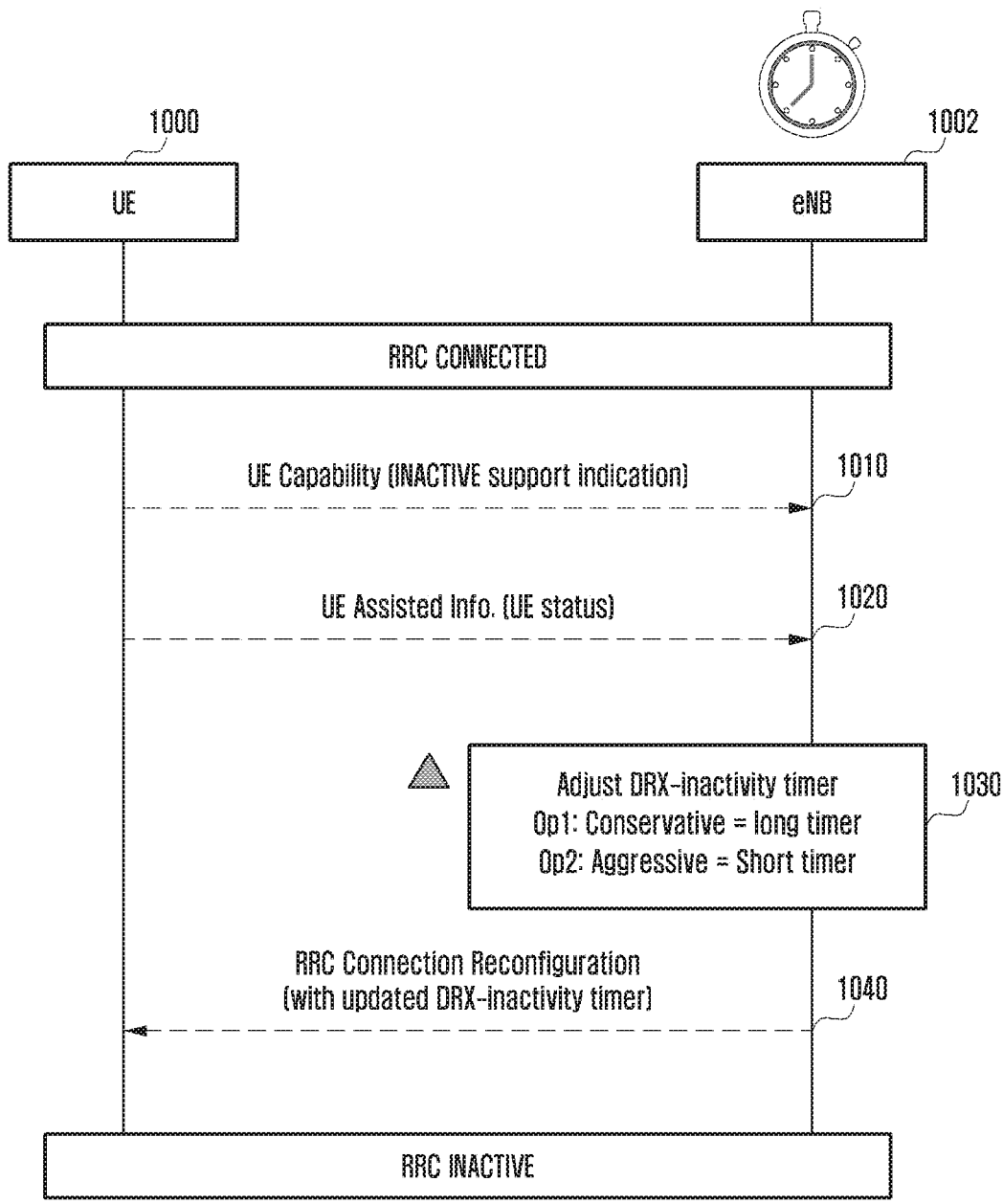
FIG. 10 is a diagram illustrating another example of a method for transitioning from an RRC connected state to an idle (or inactive) state in a communication system according to an embodiment of the present disclosure.

FIG. 10 is a diagram illustrating another example of a method for transitioning from an RRC connected state to an idle (or inactive) state in a communication system according to an embodiment of the present disclosure. Referring to FIG. 10, a corresponding DRX inactivity timer is (re)configured through explicit RRC signaling, and thereafter, the terminal may perform early C-DRX start or early transitioning operation to a long C-DRX based on the corresponding configured DRX inactivity timer.

During an initial connection between a terminal and a base station, the terminal 1000 includes information indicating whether to support an inactive state operation of the terminal in UE capability, and transmits a UE capability message (1010). Further, the terminal 1000 may report terminal information through UE assisted information during the RRC connection (1020).

The base station may perform an operation of explicitly configuring the RRC connection state. This operation is performed based on base station possession information, and the base station possession information may be, for example, last traffic characteristic information, base station inactive state operation support/non-support, and RAN-based paging configuration information. Based on the information as described above, the base station may configure a DRX-inactivity timer (1030), configures the configured DRX-inactivity timer related information to the terminal through an RRC (re)configuration message (1040), and after expiration of the corresponding DRX-inactivity timer in the terminal and the base station, the base station may explicitly transmit an RRC inactivation message to the terminal to transition to the inactive state.

At this time, in case of conservatively configuring the user-inactivity timer, the base station may operate to reduce delay of the RRC connection state and network configuration control burden instead of consuming the terminal power through configuration of a long timer value. In contrast, in case of actively configuring the user-inactivity timer, the base station may operate to increase the delay of the RRC connection state and to partially increase the network configuration control burden for low-power performance efficiency of the terminal through configuration of a short timer value.

Figure 11:
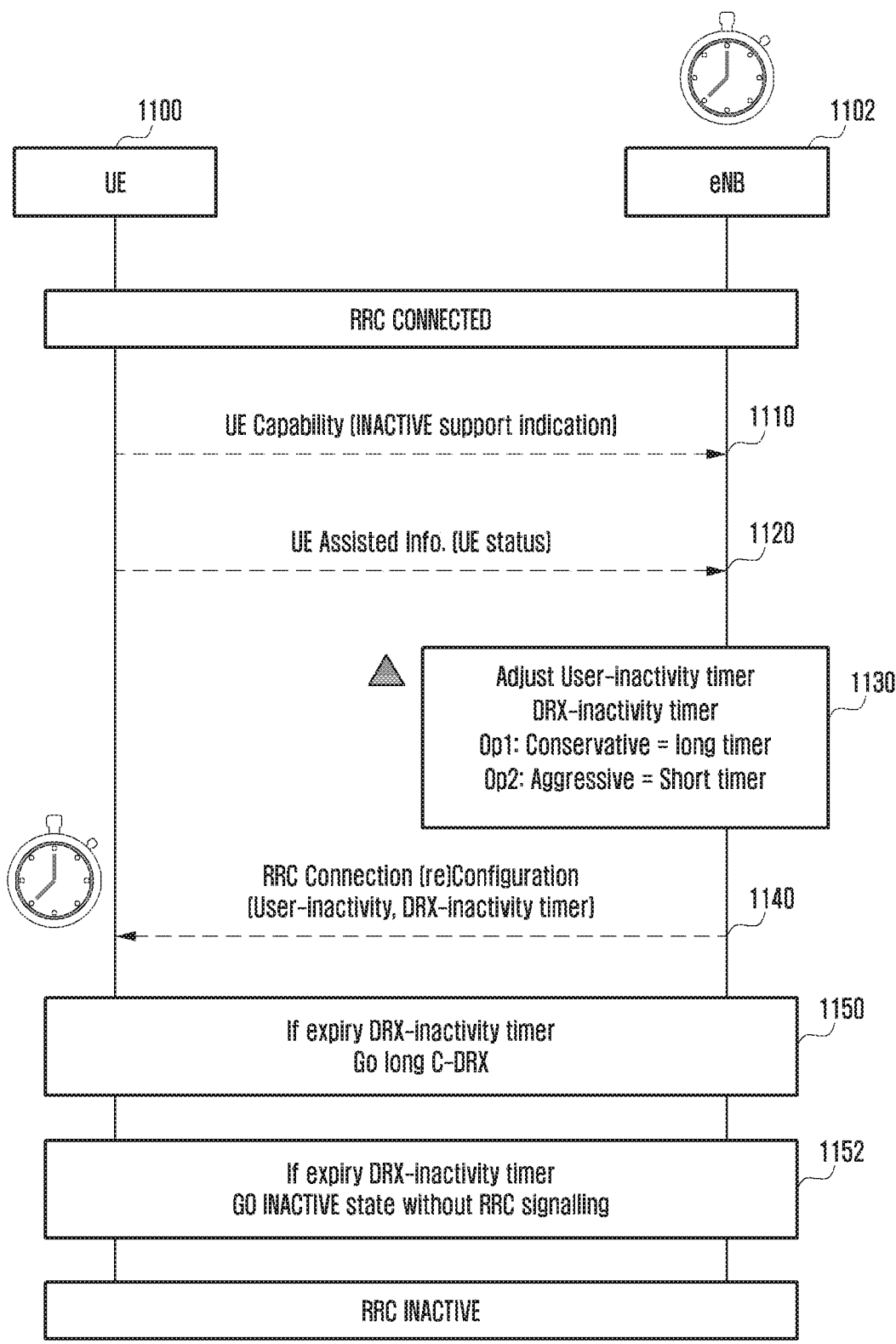
FIG. 11 is a diagram illustrating still another example of a method for transitioning from an RRC connected state to an idle (or inactive) state in a communication system according to an embodiment of the present disclosure.

FIG. 11 is a diagram illustrating still another example of a method for transitioning from an RRC connected state to an idle (or inactive) state in a communication system according to an embodiment of the present disclosure. Referring to FIG. 11, a base station may simultaneously configure a user-inactivity timer and a DRX-inactivity timer, and if the timer configured by the base station expires, an early terminal autonomous release operation may be performed.

During an initial connection between a terminal and a base station, the terminal 1100 includes information indicating whether to support an inactive state operation of the terminal in UE capability message, and transmits a UE capability message (1110). Further, the terminal 1100 may report terminal information through UE assisted information during the RRC connection (1120).

The base station may perform an operation of explicitly configuring the RRC connection state. This operation is performed based on base station possession information, and the base station possession information may be, for example, last traffic characteristic information, base station inactive state operation support/non-support, and RAN-based paging configuration information. Based on the information as described above, the base station may configure the user-inactivity timer and the DRX-inactivity timer (1130), and may transmit to the terminal an RRC connection (re)configuration message including information on the at least one timer (1140). If the configured DRX-inactivity timer expires, the terminal transitions to a long C-DRX mode. If the preconfigured DRX-inactivity timer expires through the configured RRC (re)configuration, the terminal may transition to a C-DRX or long C-DRX operation mode, and thereafter, if the user-inactivity timer expires, the terminal and the base station may transition to the inactive state without additional RRC signaling transmission.

Figure 12:
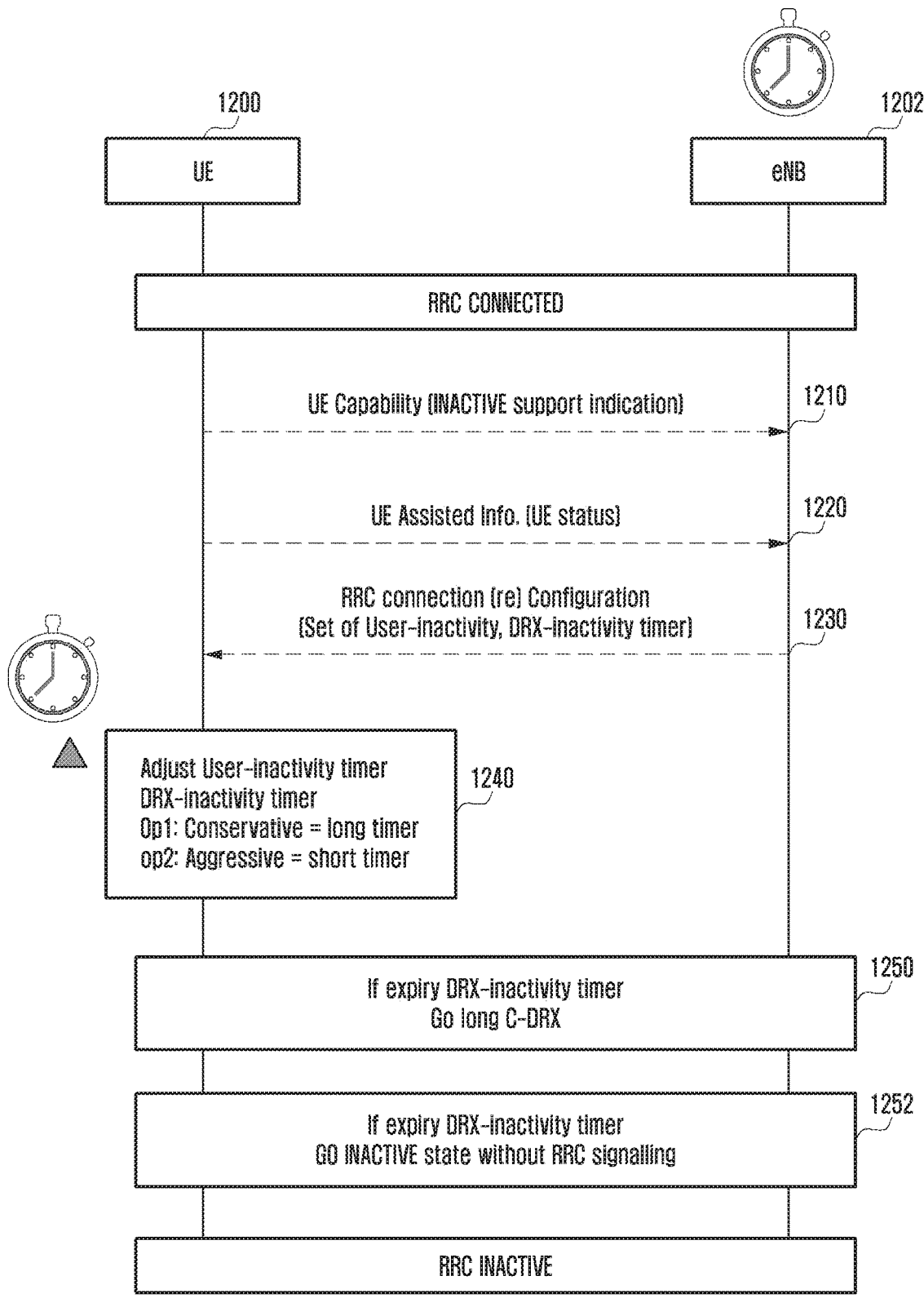
FIG. 12 is a diagram illustrating still another example of a method for transitioning from an RRC connected state to an idle (or inactive) state in a communication system according to an embodiment of the present disclosure.

FIG. 12 is a diagram illustrating still another example of a method for transitioning from an RRC connected state to an idle (or inactive) state in a communication system according to an embodiment of the present disclosure. Referring to FIG. 12, a base station may simultaneously configure a user-inactivity timer and a DRX-inactivity timer, and if the timer configured by a terminal expires, an early terminal autonomous release operation may be performed.

During an initial connection between the terminal and the base station, the terminal 1200 includes information indicating whether to support an inactive state operation of the terminal in a UE capability message, and transmits the UE capability message (1210). Further, the terminal 1200 may report terminal information through UE assisted information during the RRC connection (1220).

Thereafter, the base station transmits last traffic characteristic information that is base station possession information, base station inactive state operation support/non-support, RAN-based paging configuration information, DRX-inactivity timer and user-inactivity timer related information to the terminal through RRC connection (re)configuration (1230). Based on the received information, the terminal may configure the DRX-inactivity timer and user-inactivity timer (1240). If the configured DRX-inactivity timer expires, the terminal transitions to a long C-DRX mode. If the preconfigured DRX-inactivity timer expires through the RRC (re)configuration, the terminal may transition to a C-DRX or long C-DRX operation mode, and thereafter, if the user-inactivity timer expires, the terminal and the base station may transition to the inactive state without additional RRC signaling transmission. In this case, since the base station is also aware of the same base station related information, it may perform the timer operation like the terminal.

Further, in the present disclosure, a method for performing power saving of the terminal through a use mode control through support service characteristics, whether to apply light connectivity, and whether the terminal is in a smart terminal use state will be described below.

As additional information that becomes the basis of determining terminal and/or base station modem control, first is QoS requirement characteristic information, such as delay for support service types (e.g., eMBB, URLLC, and mMTC), and second is RRC state transition control based on whether to apply light connectivity (transition delay from an RRC idle state to an RRC connection state). Further, third is operation information based on OS control information. Based on this, a determination operation based on smart terminal input and display activation information and a determination operation based on a smart phone mount sensor (determination based on illumination, terminal activation determination operation, and distance and situation within an adjacent smart appliance group) may be performed.

As modem control methods for improvement of terminal power efficiency, five methods are proposed based on additional information that becomes the basis of determining terminal and/or base station modem control, a plurality of service types (e.g., eMBB, URLLC, and mMTC), RRC state transition control (transition delay from an RRC idle state to an RRC connection state), and determination of terminal user activation/inactivation. Among them, first corresponds to up/down traffic aggregation control operation of base station and terminal, second corresponds to terminal measurement period extension or reduction operation, and third corresponds to aggregation transmission operation for uplink/downlink unattended traffic. Further, fourth corresponds to terminal connection waiting time reduction operation through efficient radio tail period shortening, and fifth corresponds to long DRX operation method in a terminal connection mode. Hereinafter, the above-described contents will be described in more detail.

As the additional information that becomes the basis of determining the terminal and/or base station modem control, there is QoS requirement characteristic information, such as delay for support service types (e.g., eMBB, URLLC, and mMTC). An example thereof is described in Table 1 below.

TABLE 1

| | eMBB | URLLC | mMTC |
|---|---|---|---|
| Data Rate | Very high (e.g. peak rate 10 Gbps) | Not much considered | Not much considered |
| Latency | Low | Very Low (e.g. 1 ms end-to-end) | Not much considered |
| Mobility | 0 km/h to 500 km/h | Not much considered | Not much considered |
| Reliability | Not much considered | Very High (e.g. Packet loss rate; as low as 1e−04) | Not much considered |
| Power Consumption | Not much considered | Not much considered | Very Low |
| Connection Density | High (e.g. 200-2500 UEs/km$^2$) | High (e.g. 10k sensor/ 10 km$^2$) | Very High (e.g. 1M connections/ km$^2$) |

As the additional information that becomes the basis of determining the terminal and/or base station model control, there is whether to control the RRC state transition based on whether to apply light connectivity (transition delay from an RRC idle state to an RRC connection state). For this operation, specifically, in order to secure terminal power reduction effect during entering into an idle mode, network costs for terminal promotion (in the process of transitioning from an RRC idle or RRC inactive state to a connected state) control signal transmission/reception and delay may be considered. That is, in case of short (radio) tail (i.e., in case of operating a short user inactivity timer, and in case of transitioning to an idle or inactivity state after a short time after traffic transmission and reception), or in case where traffic prediction is not possible, a control signaling load is increased, and QoE (and QoS) during data transmission and reception deteriorates. Further, due to terminal request transmission, burden of base station connection release configuration, and terminal's uplink transmission, there occur problems of terminal power consumption and control resource consumption when a plurality of terminals operate. The present disclosure discloses reduction of costs caused by a burden for connection reconfiguration (e.g., LTE-based terminal transmission power consumption (523 mW)) after entering into an idle state if a traffic pattern is unable to be predicted, and delay occurrence (total 1.4 sec including paging delay of 1.28 sec and connection reconfiguration of 84 ms).

For this, the present disclosure includes a feedback transmission operation for transmitting minimum idle period information (time for maintaining the minimum idle state during shifting to an RRC idle state) and terminal promotion cost related information (specifically, control signaling and time delay information (promotion time and promotion energy consumption)-related category information). Further, the present disclosure includes sharing of the corresponding control signaling and time delay information between the terminal and the base station during performing of the base station RRC connection access (transitioning from an RRC idle or RRC inactive state to a connected state) in accordance with the terminal implementation and network configuration. The information, such as the corresponding control signaling and time delay information, during performing of the base station RRC connection access (i.e., transitioning from an RRC idle or RRC inactive state to a connected state) is information that can be grasped by the base station. Whether the base station supports the RRC inactive state (or light connectivity) may be broadcasted from the base station to the terminal in a cell through system information or/and may be notified to the terminal through RRC (re)configuration initially or thereafter. Further, the terminal may transmit information indicating whether the terminal supports the RRC inactive state (or light connectivity) and whether UE context stored in the inactive state is effective through transmission of information, such as UE capability information, to the base station in the process in which the terminal accesses the corresponding base station in an initial RRC connected state.

As operations based on whether to apply the light connection (inactive state), there are connected-to-idle early entering, new RRC state introduction (this may be called one of dormant, light connectivity, and inactive state), false paging (in case where paging is not received during paging identification) minimization operation through the inactive state introduction operation, and new operations of the base station and the terminal based on new RRC state design always maintaining the UE context in the network.

That is, in the process of transitioning from the RRC connected state to the RRC idle state (dormant, light connectivity, or inactive state) through introduction of the dormant, light connectivity, or inactive state that is a new RRC state, necessary resources and costs, that is, power consumption caused by terminal request transmission and base station connection release configuration burden and terminal uplink transmission and radio resource consumption for controlling this during the operation of a plurality of terminals, may be reduced. Further, in the process of transitioning from the RRC idle state (dormant, light connectivity, or inactive state) to the RRC connected state, necessary resources and costs, that is, power consumption caused by terminal request transmission and base station connection release configuration burden and terminal uplink transmission and radio resource consumption for controlling this during the operation of a plurality of terminals, may be reduced. Accordingly, based on the situation of the necessary resources and costs in the RRC state transitioning process, that is, power consumption caused by terminal request transmission and base station connection release configuration burden and terminal uplink transmission and radio resource consumption for controlling this during the operation of a plurality of terminals, parameters related to the RRC transition are controlled. That is, whether to support the delay and power consumption reduction in accordance with network configuration signaling in the state transitioning process through new state introduction in comparison to the existing LTE can be transferred through signaling indicated by the base station to the terminal and signaling indicated by the terminal to the base station. Based on this, the terminal and the base station may perform early entering into the RRC idle state/mode (or dormant, light connectivity, or inactive state). Further, according to the present disclosure, when RAN slice based idle (or inactive) state for each use case (service) is changed and applied, the existing C-DRX operation can be maintained in case of an eMBB service, and always connected state for low-latency transmission can be maintained in case of a URLLC service. Further, in case of the mMTC service, if the delay performance is not requested, or is at a low level, it is possible to immediately enter (transition) into the idle (or inactive) state without radio tail (i.e., application of a short or zero user inactivity timer).

A modem control method for improvement of terminal power efficiency includes embodiments of additional information that becomes the basis of determining the above-described terminal or base station modem control, and may include the following operations based on QoS requirements based on a plurality of service types (e.g., eMBB, URLLC, and mMTC), RRC state transition control, and terminal user activation or inactivation determination.

Details of modem operations for terminal power saving are described below. In the following contents, unattended traffic determination can be performed in replacement of following information that is additional information that becomes the basis of determining the terminal or base station modem control. As the additional information, there are a plurality of service types (e.g., eMBB, URLLC, mMTC, and whether delay QoS is a non-strict service), whether to apply light connectivity (transition delay from an RRC idle state to an RRC connection state), whether the network has a short connected delay in the idle state, and terminal user activation or inactivation determination information.

First, as an aggregation control operation, if the data rate is high and a receiving end has sufficient corresponding traffic buffering, a transmitting end can perform deferred transmission in comparison to immediate transmission scheduling. Further, performance improvement can be sought by delaying data transmission in accordance with the QoS level required by the traffic, and the purpose of such an operation is to improve the overall cell throughput through equipment power consumption reduction or more improved radio resource management.

An uplink/downlink traffic aggregation transmission method includes uplink traffic scheduling request (SR)/ buffer status report (BSR) aggregated transmission (i.e., operation in a MAC layer), and terminal initiation (UL) aggregated transmission for downlink traffic transmission. As an example, as DL transmission delay control methods, there are the following methods. First, the terminal may delay transmission through web-based and app-based user uplink request transmission delay. Second, the base station may determine whether to perform delay transmission of the corresponding uplink transmission traffic by parsing user's HTTP request information. After parsing the corresponding HTTP request information, the terminal may perform delay transmission of a scheduling request (SR) to the base station. Further, the terminal may transmit corresponding uplink delay possible information through SR or other feedback information or signal, and based on the information, the base station may perform uplink scheduling. In this case, a request for HTTP request transmission may be indicated in the HTTP request information in a state where a terminal user is unattended, or a new field for the corresponding information may be added to SR or other feedback information. The base station performs terminal scheduling in accordance with the terminal request information (whether the terminal user is attended or unattended).

Further, the present disclosure proposes a method for saving the terminal power through terminal transmission/ reception time reduction during scheduling with respect to the terminal (UE). As the first method, a scheduling performance technique for minimizing the transmission time transmitted and received through the corresponding terminal is proposed. As the second method, a method for reducing warming up time occurring during transition from a sleep state to an active state through transmission of burst traffic is proposed. As the third method, a method for dynamically adjusting the first and second operations so that deferred transmission attended in the first and second operations does not cause deterioration of user service satisfaction (QoE) is proposed. As an example, in case of an attended traffic, low-latency performance achievement is necessary when a user input is requested, and aggregated transmission is not performed. In case of an unattended traffic, it is not necessary to satisfy the low-latency performance of the traffic in case where DL traffic request transmission other than a user input is performed through the uplink, and if the terminal appliance power saving is necessary, the aggregated transmission may be performed.

Figure 13:
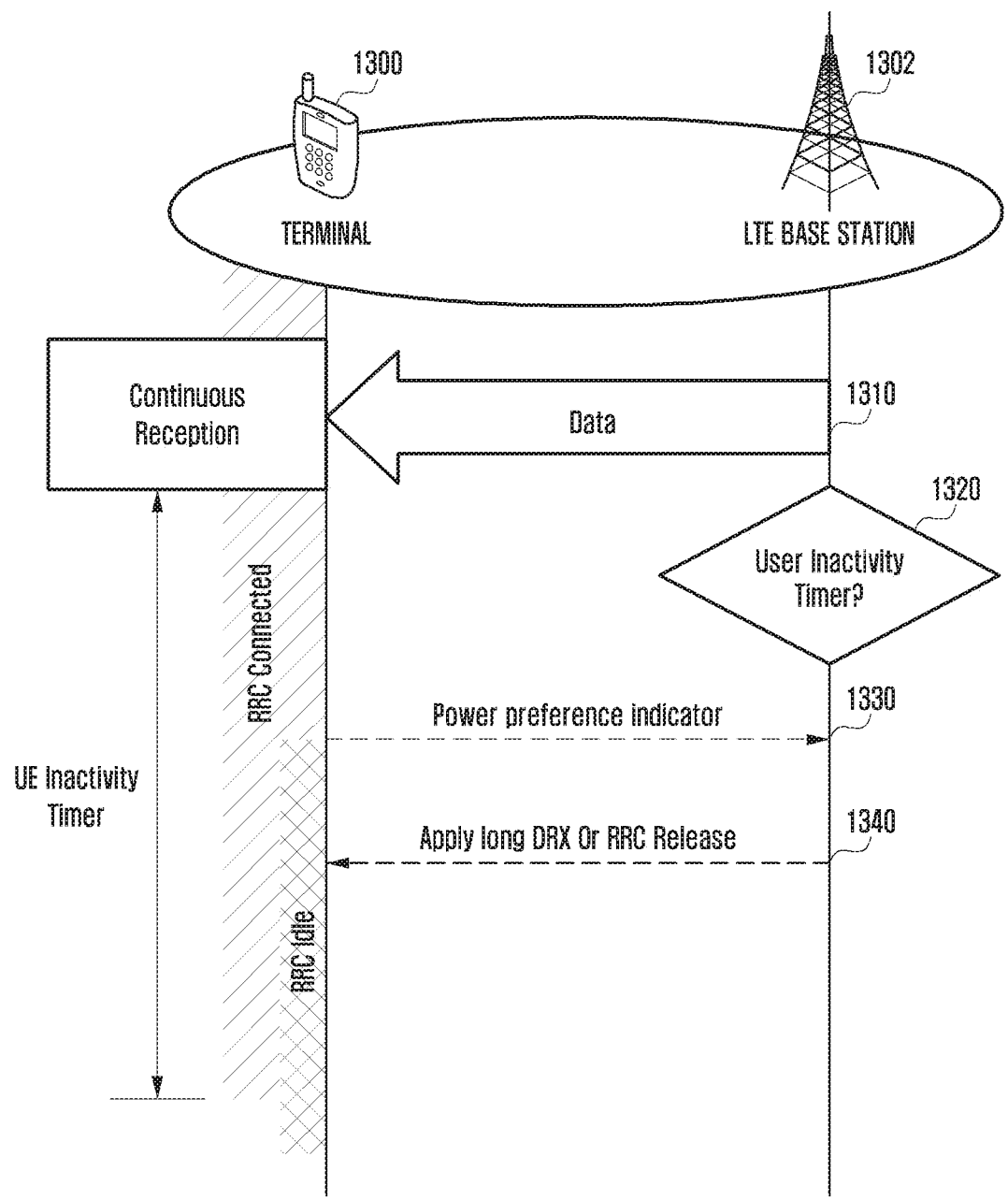
FIG. 13 is a diagram illustrating an example of a method for reducing a terminal connection waiting time according to an embodiment of the present disclosure.

FIG. 13 is a diagram illustrating an example of a method for reducing a terminal connection waiting time according to an embodiment of the present disclosure. Referring to FIG. 13, based on a power preference indicator of UE assisted information that is a terminal request, radio tail is shortened, and terminal connection waiting time may be reduced.

According to the present disclosure, user inactivity timer may be shortened in accordance with a base station control based on UE assisted information. In the above-described operation, a terminal 1300 may transmit to a base station 1310 UE assisted information indicating attended or unattended traffic in accordance with whether a user is attended or unattended. Further, in addition to user inactivity timer shortening in accordance with the base station control reflecting terminal information (whether attended or unattended), the base station may perform scheduling for the corresponding terminal. That is, if the terminal user is attended, the base station may configure the user-inactivity timer as a longer user inactivity timer, or may not perform aggregated transmission of the scheduling for the corresponding terminal. In contrast, if the terminal user is unattended, the base station may configure the user-inactivity timer as a shorter user inactivity timer, or may perform aggregated transmission to delay the scheduling for the corresponding terminal.

Terminal status information feedback for such an operation may be inscribed in SR or BSR new field during uplink transmission, or may be inscribed in an HTTP request new field during uplink traffic transmission.

Further, a method for configuring a base station radio tail based on whether to use the terminal includes a method for shortening the radio tail based on, more specifically, dedicated user attendance information (UAI) and configuring the radio tail as a short tail, that is, a short user inactivity timer when the user is unattended, and includes a method for configuring the terminal UAI value and the base station radio tail value in reverse proportion to each other.

Further, there is a method for repeatedly controlling a DRX period and a radio tail in accordance with transmission UL data characteristics as a UL data MAC header based method that is a method for determining and configuring a user-inactivity timer (radio tail) and DRX-inactivity timer by the base station. As exemplified in Table 2 below, the DRX period and the radio tail can be gradually increased or decreased.

TABLE 2

| Radio Tail/DRX period | Tail Delta ++/DRX period −− | Tail Delta −−/ DRX period ++ |
|---|---|---|
| UL Traffic Characteristic MAC Header inscription | ACK/NACK reception necessary Server Update (DL transmission attended) | ACK/NACK unnecessary Keep alive message dedicated |

That is, the radio tail value may be gradually increased, and the DRX period may be gradually decreased in a situation where ACK/NACK reception is necessary or/and in a server update (DL transmission attended) situation in accordance with UL traffic characteristics and MAC header inscription. In contrast, the radio tail value may be gradually decreased, and the DRX period may be gradually increased in a situation where ACK/NACK is unnecessary or/and in a keep alive message transmission situation.

Further, the present disclosure includes a base station DRX state and period configuration operation based on the probability that the user uses the terminal. In case where the base station configures the DRX state and the DRX period, the DRX state changing operation includes an operation of immediately entering into the corresponding DRX state other than the existing timer-based operation. In this case, as a terminal start operation option, a configuration operation in which the terminal can change the DRX state and the DRX period is included in an initial base station configuration RRC connection configuration. On the other hand, as a base station start operation option, the base station may transmit a control signal (e.g., RRC (re)configuration or system information (SI), for example, essential SI or on-demand SI) to the terminal based on the feedback information based on the terminal use probability, and may change the corresponding DRX state and period configuration.

Further, this operation includes an operation in a continuous reception mode in a situation where terminal use (user attend) probability is increased, or an operation of shifting to a short DRX. In contrast, the operation includes long DRX (period increase), radio tail shortening (i.e., user inactivity timer shortening), RRC release and RRC inactivation operations in a situation where terminal use probability is decreased (user unattended).

Further, the present disclosure describes a method for changing radio tail configuration between multi-RATs of the terminal. The method includes an operation of configuring a low-power efficiency RAT in a short tail mode and configuring a high-power efficiency RAT in a long tail mode based on whether to transmit a keep alive packet that is an application autonomous creation traffic in a terminal unused (user unattended) situation. For example, as an example of a RAT (air link) having low power efficiency, transmission for mmWave base station that is a 5G high-frequency band base station link may be exemplified, and as an example of a RAT having high power efficiency, an LTE base station link operating in a low frequency band may be exemplified. In other words, since the 5G mmWave base station requires an additional operation, such as beam scan, for beamforming transmission, it is advantageous to operate in a short tail (short user inactivity timer) mode, and based on this, it is possible to transition to an early RRC release (i.e., transition to an idle state), an early RRC inactivation (i.e., transition to an RRC inactive state), and an early long C-DRX mode, and to transition from an idle state to a long DRX mode having long period.

Further, even in case of low-power mode operation of the terminal, it is possible to operate a link of a low-frequency band LTE base station that is a link having high power efficiency in a long tail (longer user inactivity timer) mode to maintain stable data transmission/reception and low-latency performance. The present disclosure includes a method in which high power efficiency (e.g., LTE) base station configures and operates a C-DRX having a relatively short period in comparison to the low power efficiency (e.g., beamforming transmission or mmWave) base station in a connected state. Further, the high power efficiency (e.g., LTE) base station may operate in a short DRX period relatively in an idle/inactivate state in comparison to the low power efficiency (e.g., beamforming transmission or mmWave) base station.

Figure 14:
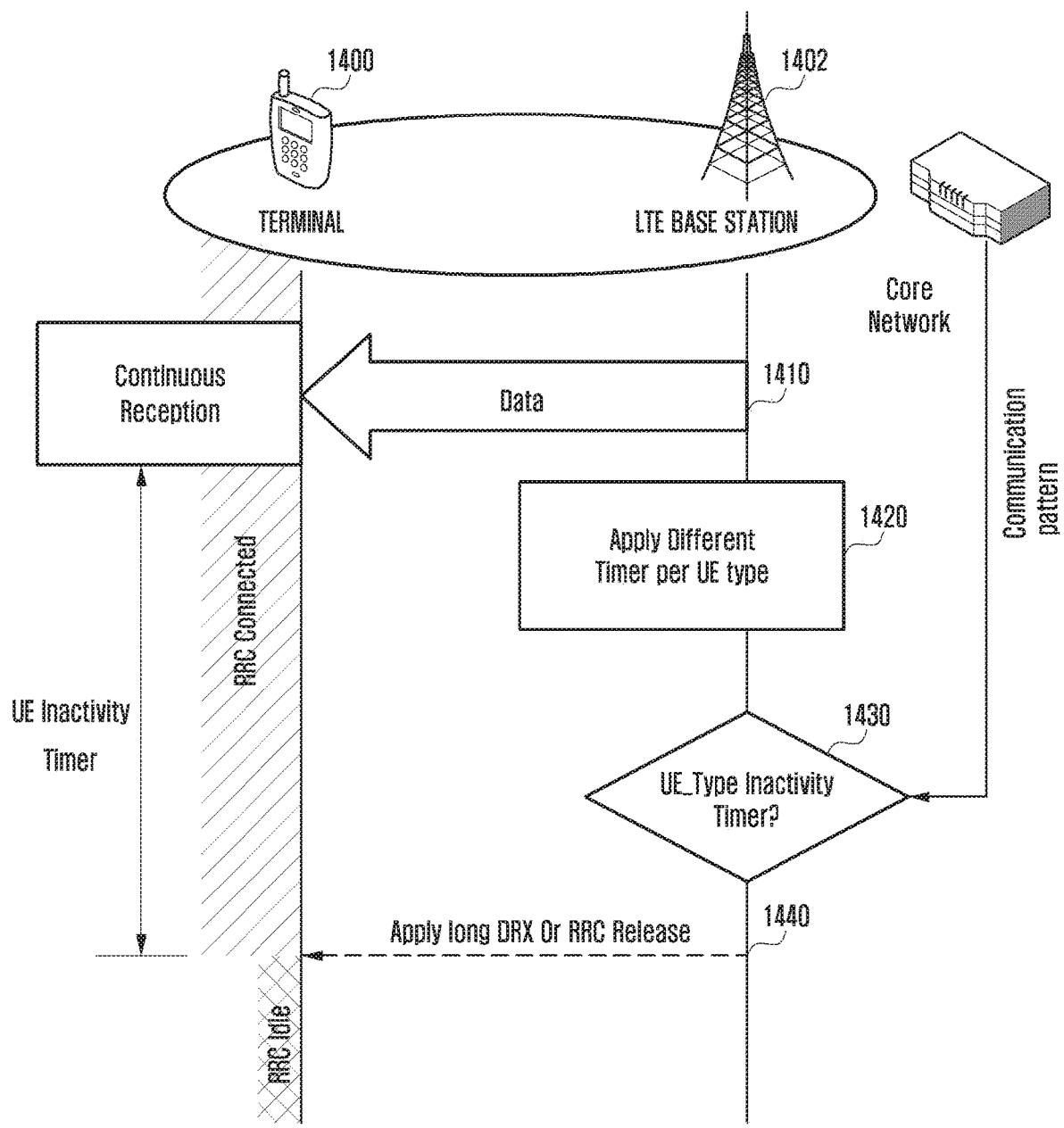
FIG. 14 is a diagram illustrating another example of a method for reducing a terminal connection waiting time according to an embodiment of the present disclosure.

FIG. 14 is a diagram illustrating another example of a method for reducing a terminal connection waiting time according to an embodiment of the present disclosure. Referring to FIG. 14, a base station operation for shortening radio tail based on network configuration information is illustrated. This operation includes a user inactivity timer shortening operation in accordance with base station control based on core network (CN) assisted information (network collection information).

As a method for improving power efficiency as a long DRX operation in a terminal connection mode, there is a method in which the base station delays the corresponding traffic transmission by delaying an actual uplink transmission time after data occurrence while the terminal performs C-DRX operation in a state where the existing DRX state diagram operation rule is maintained during the terminal start operation. This includes an operation in which the terminal performs delayed transmission control operation using uplink SR or BSR, and controls delayed transmission using HTTP request that is an uplink traffic.

As another method, the base station may control the radio tail based on terminal and CN information. This includes a control operation by the base station based on terminal feedback information based on UE assisted information and a control operation by the base station based on network information (core network assisted information (network collection information)). For example, such information may be information indicating unattended traffic corresponding to a case where the terminal user is unattended, and is transmitted to the base station. Reflecting the terminal information (i.e., whether a user is in an attended or unattended state), the base station may directly perform scheduling of the corresponding terminal (in case of attended), and may directly transmit the corresponding traffic or may delay the transmission time in case of unattended. Even in this case, the terminal information (attended/unattended) may be included in an uplink SR and/or BSR new field, or may be included in an HTTP request new field corresponding to uplink traffic transmission.

Further, a method for controlling the transmission time may be performed based on feedback indicating whether the traffic is a traffic requested by the terminal user. That is, if the terminal transmits a request message to a server through an uplink, the server performs downlink transmission based on this, and it is necessary to predict the characteristics of the downlink traffic delay-related particulars (delay request particulars and/or whether the data should be directly transmitted or delayed transmission thereof is possible). Further, it is necessary to predict whether downlink data (traffic) is generated in response to the uplink data transmission and whether it is necessary to transmit the generated downlink data. Accordingly, it is necessary for the terminal to provide to the base station a feedback of whether the uplink request of the terminal is made by the user or is automatically generated by an application. Accordingly, as a new control signaling method for this or a design method for correcting the existing control signaling, a method for inscribing in a new field of the existing MAC control element (specifically, inscribe in a new field in a buffer status report (BSR)) is included. Further, the corresponding information may be inscribed at additional bits of the scheduling request (SR). Further, the information may be inscribed in a UL data MAC header. After the corresponding UL data, whether another DL data transmission is necessary in accordance with the request may be 1) whether it is necessary to receive ACK/NACK, 2) whether a keep alive message is dedicated, and 3) whether the data transmission is for server update. This may be used as the basis of determination when the base station controls the DRX period and the radio tail.

Figure 15:
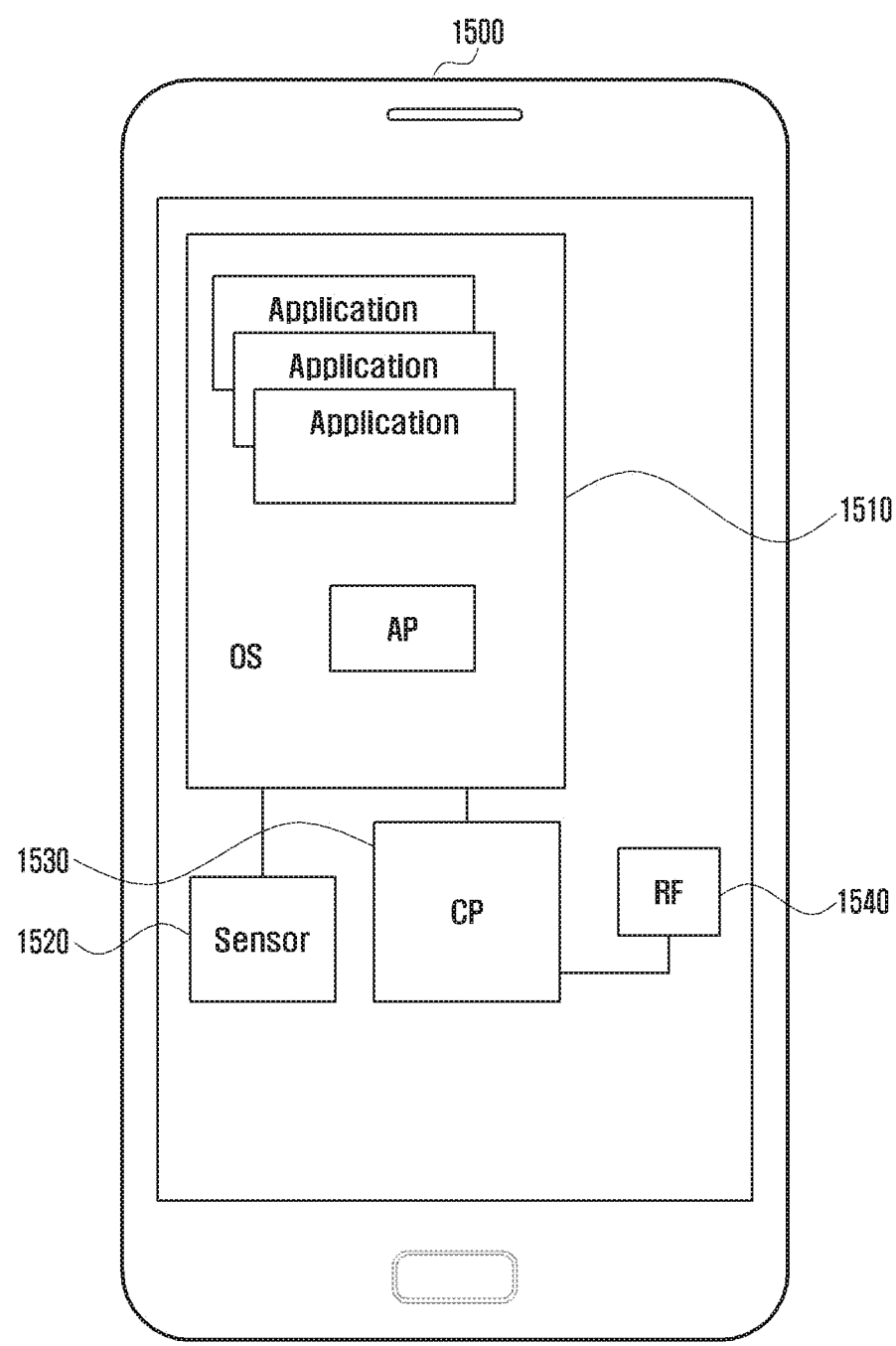
FIG. 15 is a diagram illustrating a smart phone structure (AP and CP) explaining a method for determining whether a terminal user is activated or inactivated according to an embodiment of the present disclosure.

FIG. 15 is a diagram illustrating a smart phone structure (AP and CP) explaining a method for determining whether a terminal user is activated or inactivated according to an embodiment of the present disclosure. Referring to FIG. 15, a smart phone (hereinafter, it can be mixedly used with a smart terminal or smart appliance) is composed of an OS 1510, a sensor 1520, a communication processor (CP) 1530, and an RF unit 1540, and in the OS, an application processor (AP) and a plurality of applications exist.

Additional information that becomes the basis of determining terminal or base station modem control includes 1) determination operation based on smart terminal input and display activation information, 2) determination operation based on a smart phone mount sensor (determination of illumination and terminal activation), and 3) information obtained by a determination operation based on whether a distance and a situation are those within an adjacent smart appliance group based on an OS control information. Further, additional information that becomes the basis of determining other terminal or base station modem control includes information in accordance with determination whether the terminal user is activated or inactivated. The detailed contents for respective operations are described as follows.

Additional information that becomes the basis of determining base station modem control may also be an OS control based smart terminal input, display activation information, and display information. As an example, the additional information includes display screen-on, keypad input-on, touch screen input based user attendance determination, and determination operation based on sensor-based additional information usage (e.g., camera character gaze recognition). Further, the additional information includes a method for operation in a terminal power saving mode in a user sleep state determination situation. Further, the additional information includes user sleep time pattern, operation based on current time information and user non-attendance detection operation based on peripheral environment detection using the sensor of the smart phone, operation applied when a user of a smart phone or/and wearable device is unattended over a predetermined time, and operation by the terminal and the base station for changing to a low-power mode.

Further, as an example of terminal user non-attendance determination based on a smart phone mount sensor, a method for synthetic detection and determination based on a smart phone and a wearable sensor may be applied, and here, the determination includes determinations based on movement of the device itself (gyro, acceleration, geomagnetic sensor, atmospheric pressure, and camera), movement around the device (gesture sensor and proximity sensor), and peripheral illumination (hall sensor and RGB sensor).

Examples of smart phone terminal mount sensors and additional information that becomes the basis of determining the terminal or base station modem control in accordance with the functions are described in Table 3 below.

TABLE 3

| Sensor | Function | Usage |
|---|---|---|
| Gesture sensor | Recognize hand operation through sensing of infrared rays reflected from hand palm | It is applied to air gesture function and recognition is possible only by hand operation without touch. |
| Proximity sensor | Recognize whether smart phone is located near body using infrared rays | It is used for direct call or turn-off of screen during calling. |
| Gyro sensor | Recognize slope of smart phone through sensing of terminal rotation state on 3 axes | It is conveniently used for reading through movement of screen up and down using Samsung smart scroll together with face recognition function. |
| Acceleration sensor | Detect terminal movement state on 3 axes | It is used for walking mate. |
| Geomagnetic sensor | Detect magnetic field strength on 3 axes | It is used for maps to measure accurate azimuth. |
| Atmospheric pressure sensor | Grasp atmospheric pressure at current location | It measures calorie consumption amount during mountain climbing or ascending/descending of stairs by calculating gradient after measuring atmospheric pressure difference |
| Temperature/ humidity sensor | Grasp temperature and humidity of surrounding environment | Most pleasant environment for life is visually displayed on S health screen. |
| Hall sensor | Recognize open/close state of flip cover | It is applied to S view cover to identify primary information even without opening a flip cover. |
| RGB sensor | Measure strength of red, green, blue, and white of light source | It is applied to Samsung adapt display to control screen brightness and clearness so as to reduce burden of eyes when amusing eBook or application. |
| Fingerprint sensor | User authentication based on fingerprint pattern | It is used for user authentication during Samsung pay payment. |

As an embodiment of an operation of controlling a terminal modem using a terminal sensor and additional information of an OS end, the following operations may be included. This is a method for discriminating terminal user's direct input traffic and automatically generated traffic from each other, and it can be identified whether the traffic is directly input by the user before a screen touch or is automatically generated based on the smart terminal or smart appliance mount sensor information.

For example, a smart appliance may determine whether the terminal user is attended or unattended based on appliance surrounding movement. More specifically, user attendance/non-attendance may be determined based on body face or hand proximity detection and user's gaze recognition detection. As related sensors of a smart terminal for such operations, a gesture sensor (hand operations), a proximity sensor (infrared body proximity), and a camera (gaze) may exist.

Another method is a determination method based on movement of the appliance itself. It is possible to determine whether rotating angular velocity of a terminal or a smart watch exceeds a threshold value or whether the angular velocity range is discriminated based on the user's terminal movement pattern in a situation where a screen for an input exists on one surface only, and a big change of the angular velocity is required. As related sensors of a smart terminal for such operations, there are a gyro sensor (terminal slope), an acceleration sensor (movement speed), a geomagnetic sensor (azimuth), and an atmospheric pressure sensor.

Further, there may be a method for discriminating terminal user's direct input traffic and automatically generated traffic from each other based on the surrounding illumination. Based on the surrounding illumination, it is possible to determine whether an appliance is put in a bag or a pocket, whether a cover is closed, and whether a user is in a sleep situation. In order to perform such operations, a hall sensor (illumination), an RGB sensor, and a microphone sensor (sound) may be used as related sensors of the smart terminal.

Further, a method for determining whether a wearable device connected to the smart terminal is worn and whether the terminal is in a handheld state includes a method for detecting wrist wearing state of a smart watch and terminal grip situation, and for measuring a body temperature through a temperature sensor in the terminal.

Figure 16:
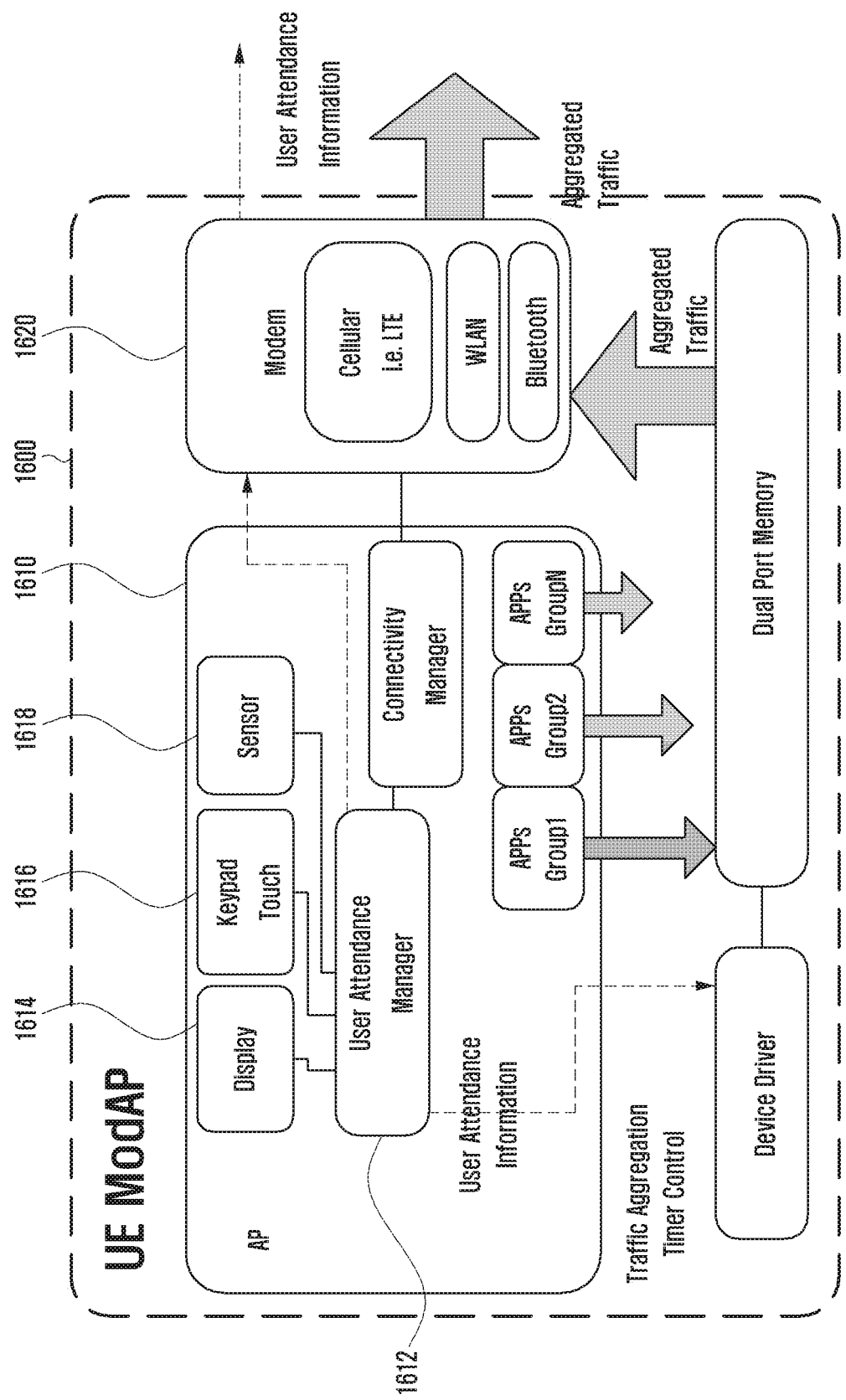
FIG. 16 is a diagram illustrating an AP-CP interface describing detailed operations of a method for determining whether a terminal user is activated or inactivated according to an embodiment of the present disclosure.

Examples for controlling a terminal modem using a terminal sensor and additional information at the OS end are as follows. As a method for discriminating terminal user's direct input traffic and automatically generated traffic from each other, an operation of recognizing and determining user's motion or behavior pattern and an operation of reflecting this in the control of a modem end may be performed in a combination of a sensor event and/or information through respective ones and in combination thereof, based on the above-described movement surrounding the appliance, the movement of the appliance itself, surrounding illumination, wearable appliance wearing and terminal handheld detection. FIG. 16 is a diagram illustrating an AP-CP interface describing detailed operations of a method for determining whether a terminal user is activated or inactivated according to an embodiment of the present disclosure. Referring to FIG. 16, the detailed contents for respective operations for AP-CP interface will be described below.

Determination of whether to use the user's terminal is performed by a user attendance manager 1612 for recognizing user's motion or behavior pattern in combination of a sensor event and/or information, and for example, a determination operation based on a display 1614, keypad/touch input 1616 or not, a sensor 1618 input value, and a peripheral device communication connection state, and a modem control operation based on an OS idle and device idle states in Android OS middleware (AP) may be performed. Further, if it is determined that the user uses the terminal when the traffic aggregation window is changed based on the terminal use information, the corresponding traffic is immediately transmitted to the modem, and the traffic aggregation window can be increased in accordance with the terminal user's use probability reduction. If it is determined that the user's terminal use probability is very low or 0%, the traffic aggregation window becomes maximized, and in this case, the maximum data rate at which the terminal can optionally delay the transmission includes a buffering operation to delay data transmission using the remaining memory excluding a margin for a stable operation from the maximum memory capacity included in the terminal. The maximum aggregation window based operation based on an application (APP) operation is also included.

Figure 17:
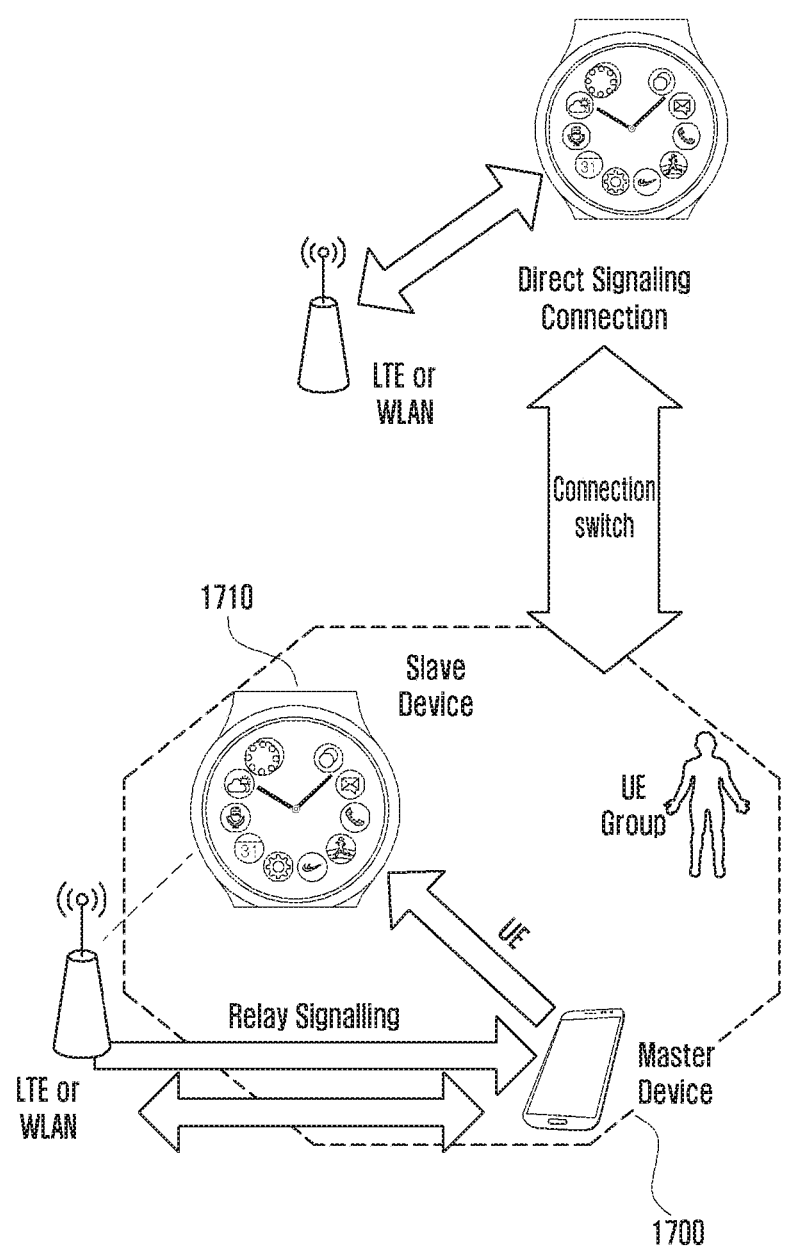
FIG. 17 is a diagram illustrating a determination event based on a distance and a situation recognition within an adjacent smart appliance group according to an embodiment of the present disclosure.

FIG. 17 is a diagram illustrating a determination event based on a distance and a situation recognition within an adjacent smart appliance group according to an embodiment of the present disclosure. Referring to FIG. 17, for determination based on the distance and situation recognition within an adjacent smart appliance group, the corresponding event includes the following operations based on detection of a case where a wearable device 1710 and a smart phone (master device) 1700 are separated from each other over a specific distance. In a state where a user wears the wearable device, user non-attendance may be determined based on event detection in separation from the smart appliance over a threshold distance, whether the terminal operates in a power saving mode, and wearable device input detection. This is used as the basis of determining the terminal or base station modem control, and the base station may control the DRX period and radio tail, or/and the terminal may control the DRX period and radio tail. Further, according to the present disclosure, if the wearable device moves near to the master device (terminal), the terminal returns from a low-power mode to a normal communication mode.

Table 4 below describes an operation of distinctively applying events for situations of the wearable device as an example of an operation in which the wearable device applies a power saving mode for RAT capacities.

with an LTE macro base station 1800, and the coverage of the NR micro base station is included in the LTE macro coverage.

Figure 19:
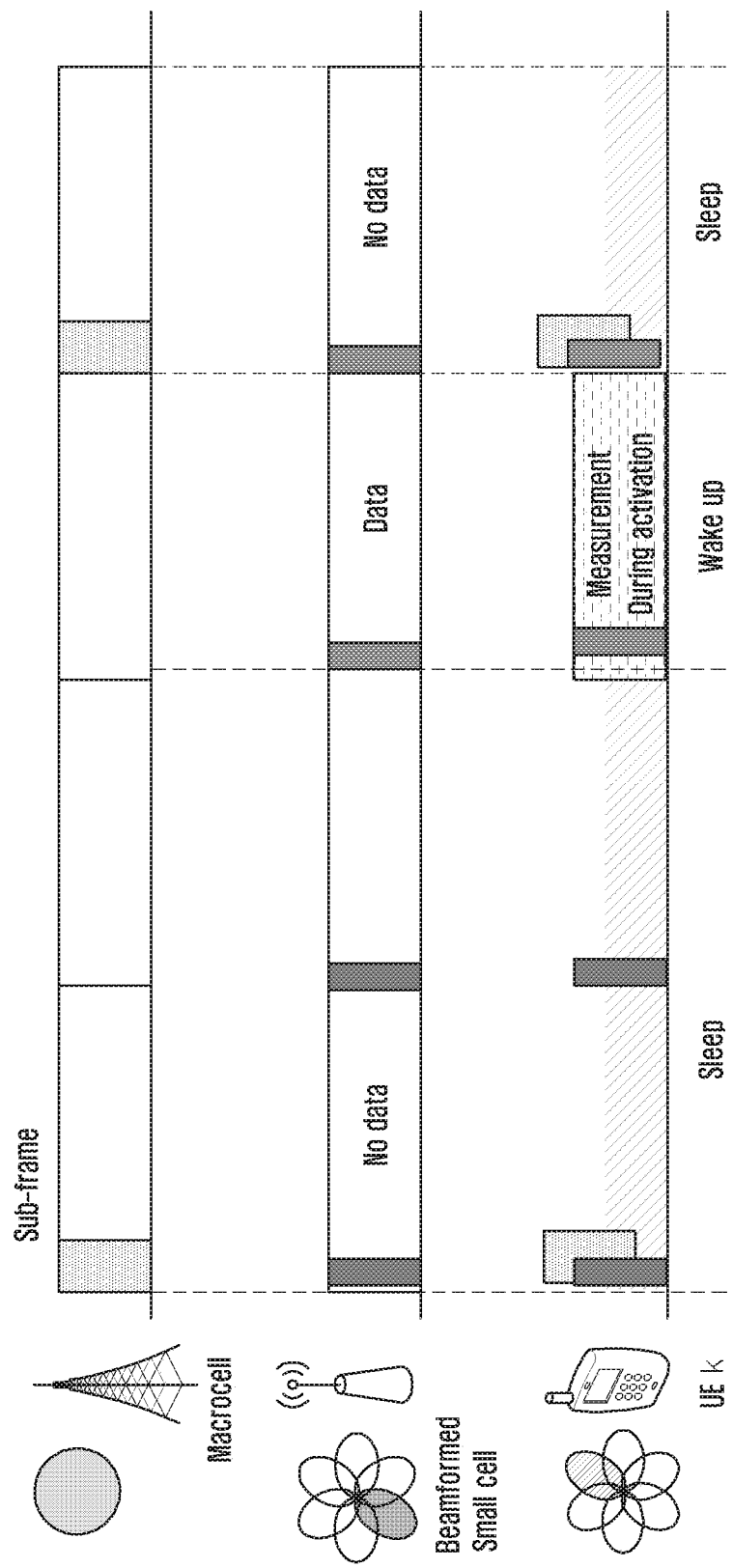
FIG. 19 is a diagram illustrating DRX operation of an LTE cell and a new RAT cell during a non-standalone LTE-NR tight interworking operation of a 5G communication system according to an embodiment of the present disclosure.

FIG. 19 is a diagram illustrating DRX operation of an LTE cell and a new RAT cell during a non-standalone LTE-NR tight interworking operation of a 5G communication system according to an embodiment of the present disclosure. As DRX cycle operation methods for links for dual connection of a terminal in an LTE (MeNB)-NR (SeNB) tight interworking structure, first, LTE (MeNB) and NR (SeNB) may be controlled and operated in respective independent DRX cycles, and second, it is possible to synchronize LTE (MeNB) and NR (SeNB) on duration. Third, there may be a method for exchanging information for synchronizing LTE (MeNB) and NR (SeNB) on duration and exchanging configuration information of LTE and NR DRX parameters. The exchanging method includes 1) DRX configuration information exchange between MeNB and SeNB base stations, 2) predefined DRX parameters configuration application for transmission/reception traffic service types, and 3) an information transmission method between MeNB and SeNB modems in the terminal Fourth, although LTE (MeNB) and NR (SeNB) operate in a separate DRX period, the period is increased by multiples as a scale factor to match on-duration synchronization, and the terminal can simultaneously activate a plurality of modems and/or resource configurations. Fifth, although LTE (MeNB) and NR (SeNB) operate in a separate DRX period, the terminal can exclusively activate a plurality of modems or/and resource configurations based on the DRX parameters configuration of other links. Sixth, although LTE (MeNB) and NR (SeNB) operate in a separate DRX period, if the period is increased by multiples as a scale factor, the period can exchange scale factor information. Specifically, the exchange method includes 1) DRX configuration information exchange between MeNB and SeNB base stations, 2) predefined DRX parameters configuration application for transmission/reception traffic service types, and 3) an information transmission operation between MeNB and SeNB modems in the terminal.

Figure 20:
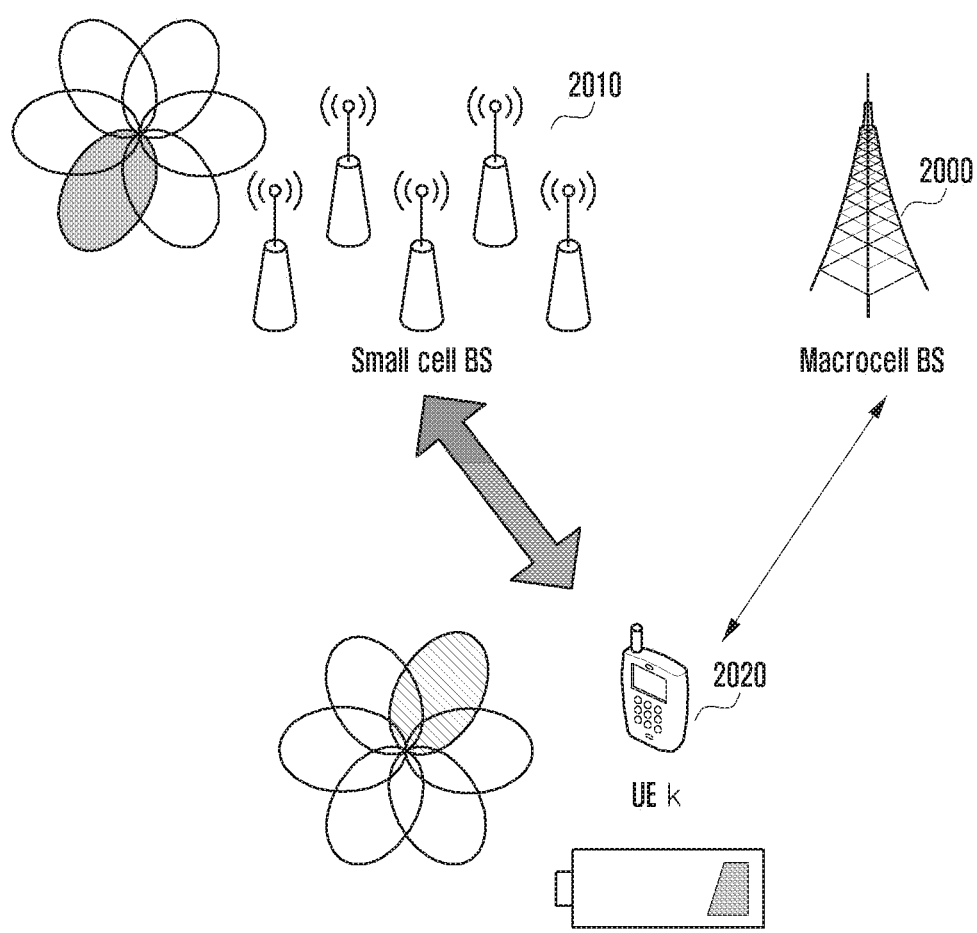
FIG. 20 is a diagram illustrating an operation in which a 5G new RAT terminal performs signal transmission and reception with a macro-cell base station and a small-cell base station during a non-standalone LTE-NR tight interworking operation of a 5G communication system according to an embodiment of the present disclosure.

FIG. 20 is a diagram illustrating an operation in which a 5G new RAT terminal performs signal transmission and reception with a macro-cell base station and a small-cell base station during a non-standalone LTE-NR tight interworking operation of a 5G communication system according

TABLE 4

| Case | Wearable device RAT capacity | Event applying smart phone terminal power saving mode: It operates when wearable device moves out of coverage. |
|---|---|---|
| 1 | Possession of proximity transmission RAT only Ex) Bluetooth earphone | Immediate smart phone power saving mode operation |
| 2 | Possession of middle-distance RAT Ex) WLAN smart watch | It is necessary to perform transmission to wearable device via another WLAN AP Smart phone relay based WLAN transmission/reception: Smart phone power saving mode impossible WLAN individual transmission/reception: Smart phone power saving mode possible |
| 3 | Possession of long-distance RAT Ex) LTE smart watch | Smart phone power saving mode operation (Path switch to LTE network is necessary) Wearable device individual transmission/reception operation |

Figure 18:
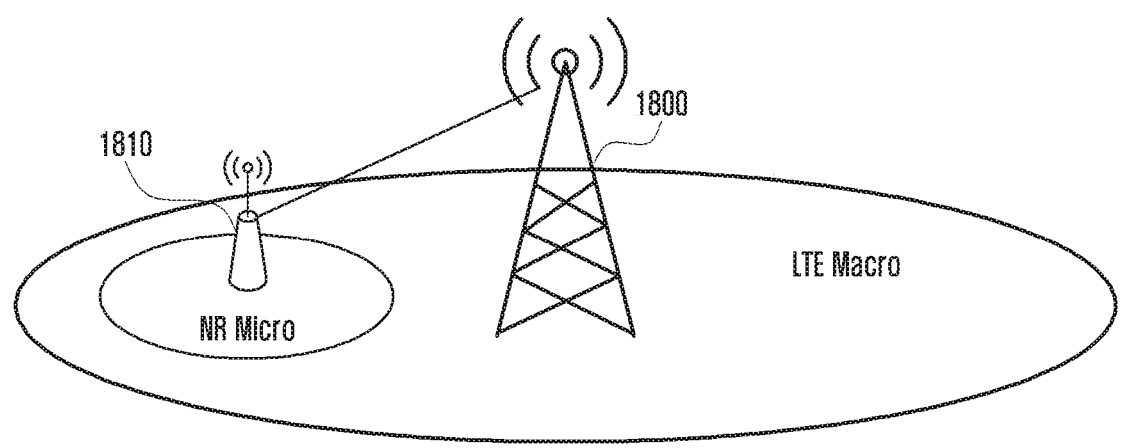
FIG. 18 is a diagram illustrating network topology during a non-standalone (NSA) LTE-NR tight interworking operation of a 5G communication system according to an embodiment of the present disclosure.

FIG. 18 is a diagram illustrating network topology during a non-standalone (NSA) LTE-NR tight interworking operation of a 5G communication system according to an embodiment of the present disclosure. An NR micro base station 1810 is located in an LTE macro coverage in accordance to an embodiment of the present disclosure. FIG. 20 illustrates terminal reception situation from a macro-cell base station and a small-cell base station as the 5G multi-RAT terminal reception drawing. In such macro-cell and small-cell hierarchical structure network, the macro-cell performs important connection management (RRC and NAS setup) and mobility support (Scell addition/release), and thus the Scell may be intermittently used only in case where traffic transmission and reception is necessary. The delay scheduling method proposed in the present disclosure may show a larger performance gain in an overlay network, but may also be applied and operated even in the existing network composed of one layer.

Figure 21:
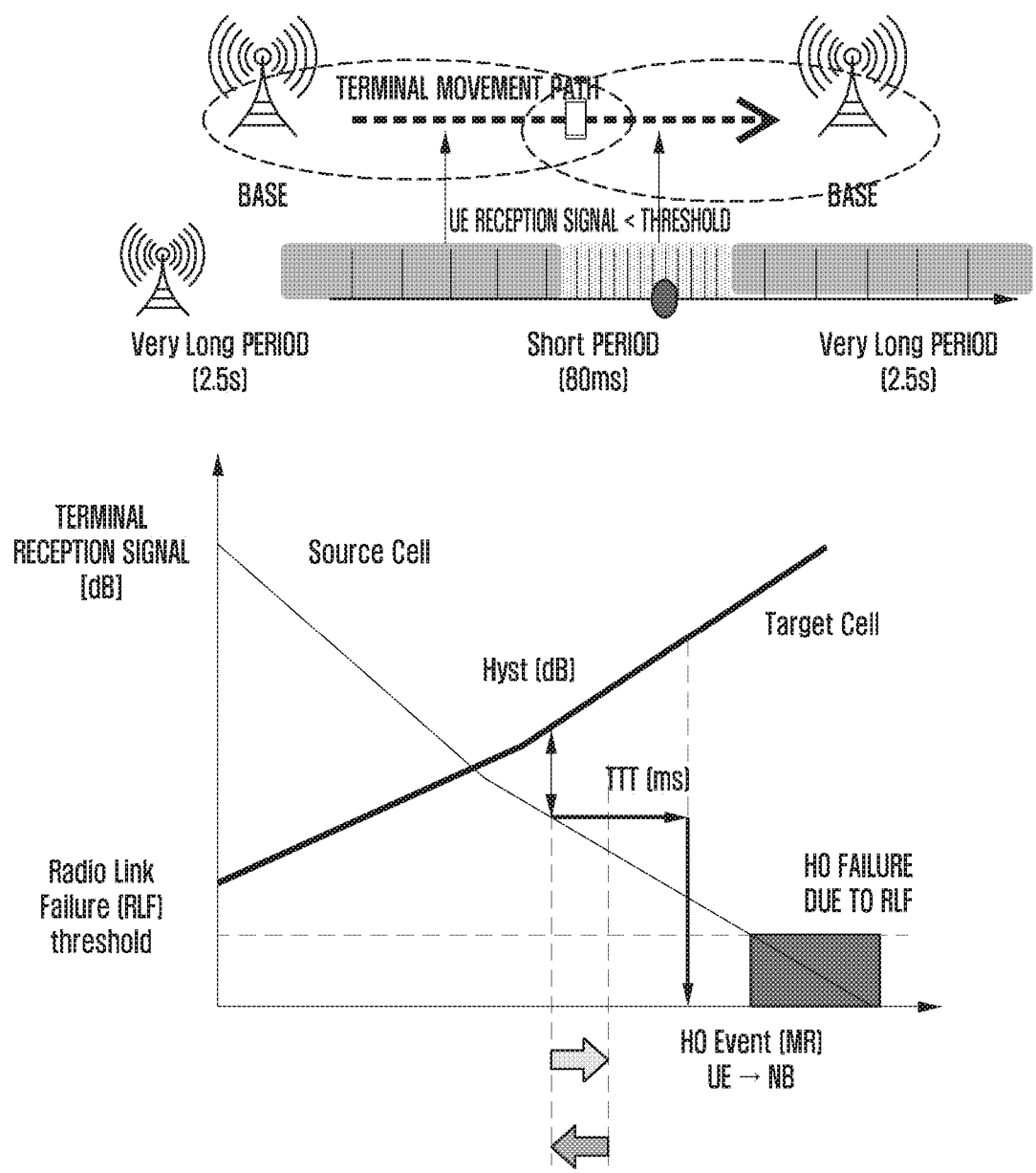
FIG. 21 is a diagram illustrating a terminal measurement period extension or reduction operation according to an embodiment of the present disclosure.

FIG. 21 is a diagram illustrating a terminal measurement period extension or reduction operation according to an embodiment of the present disclosure. Referring to FIG. 21, on a cell boundary, terminal measurement period is varied and thus the mobility performance of the terminal can be secured.

For the terminal measurement period extension or reduction control operation, the present disclosure uses additional information when the terminal measurement performance period extension (long measurement period) operation is performed. If it is determined that the terminal user is unattended, the terminal measurement performance period extension (long measurement period) can be performed based on this. Further, if the uplink/downlink traffic does not exist (or delayed transmission thereof is possible), the terminal measurement period extension (long period) or measurement operation can be blocked.

Further, for long DRX having no handover performance deterioration, the terminal measurement period is varied on the cell boundary to secure the mobility performance, and for the terminal measurement period control on the cell boundary, the terminal determines the cell boundary based on the received signal, and can secure the mobility performance even in case of the long DRX operation through inclusion of the operation of shortening the measurement period.

Such an operation corresponds to a method for separating the DRX period and the measurement period and operation from each other. That is, the base station configures the minimum measurement period in accordance with the DRX period, and based on this, it can control to make additional measurement operation possible in addition to the minimum measurement period if the terminal requires the same (i.e., user attendance or traffic transmission delay reduction). That is, since uplink transmission is possible even during the DRX when a cell change event occurs, the terminal can prevent delay and handover performance deterioration by starting the uplink transmission even in a DRX sleep period if the cell change is expected (measurement report event trigger) as the result of the measurement. Such an operation includes an aggregation transmission operation for the uplink/downlink unattended traffic, a terminal connection waiting time reduction operation through efficient radio tail period shortening, and a long DRX operation within a terminal connection mode (RRC connected state).

Figure 22:
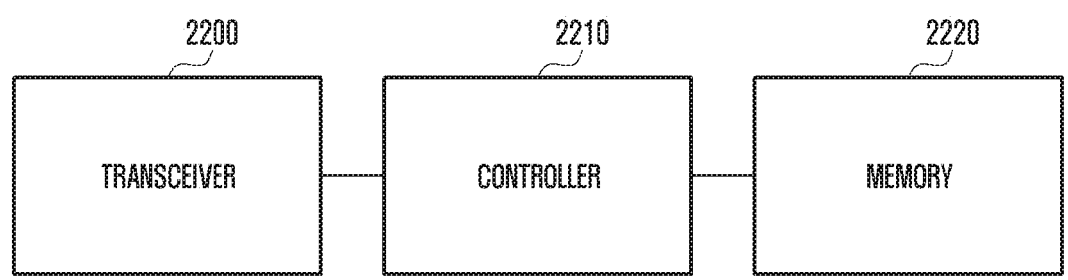
FIG. 22 is a diagram illustrating the structure of a terminal according to an embodiment of the present disclosure.

FIG. 22 is a diagram illustrating the structure of a terminal according to an embodiment of the present disclosure.

Referring to FIG. 22, a terminal may include a transceiver 2210, a controller 2220, and a memory 2230. In the present disclosure, the controller may be defined as a circuit or application-specific integrated circuit or at least one processor.

The transceiver 2210 may transmit and receive signals with other network entities. The transceiver 2210 may receive, for example, system information from a base station, and may receive a synchronization signal or a reference signal.

The controller 2220 may control the overall operation of the terminal according to an embodiment proposed in the present disclosure. For example, the controller 2220 may control a signal flow between respective blocks to perform the operation according to the embodiment as described above. Specifically, the controller 2220 transmits to the base station UE capability information including information indicating whether to support a radio resource control (RRC) inactivation state, and controls the transceiver to transmit terminal information to the base station. If a timer determined based on the terminal information expires, the controller may control to transition to the RRC inactivation state.

The memory 2230 may store therein at least one of information transmitted and received through the transceiver 2210 and information generated through the controller 2220.

Figure 23:
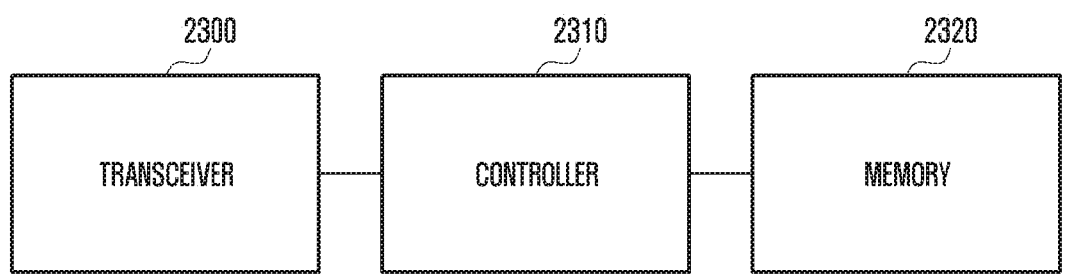
FIG. 23 is a diagram illustrating the structure of a base station according to an embodiment of the present disclosure.

FIG. 23 is a diagram illustrating the structure of a base station according to an embodiment of the present disclosure.

Referring to FIG. 23, a base station may include a transceiver 2310, a controller 2320, and a memory 2330. In the present disclosure, the controller may be defined as a circuit or application-specific integrated circuit or at least one processor.

The transceiver 2310 may transmit and receive signals with other network entities. The transceiver 2310 may transmit, for example, system information to a terminal, and may transmit a synchronization signal or a reference signal.

The controller 2320 may control the overall operation of the base station according to an embodiment proposed in the present disclosure. For example, the controller 2320 may control a signal flow between respective blocks to perform the operation according to the embodiment as described above. Specifically, the controller 2320 receives from the terminal UE capability information including information indicating whether to support a radio resource control (RRC) inactivation state, and controls the transceiver to receive terminal information from the terminal. If a timer determined based on the terminal information expires, the controller may control to transition to the RRC inactivation state.

The memory 2330 may store therein at least one of information transmitted and received through the transceiver 2310 and information generated through the controller 2320.

The invention claimed is:

1. A method performed by a terminal in a wireless communication system, the method comprising:
   identifying that a cause of a radio resource control (RRC) connection resume is an area update in case that the terminal is in an inactive state;
   identifying whether an RRC connection delay for an access control is configured or not to the terminal in case that the cause of the RRC connection resume is the area update;
   in case that the RRC connection delay is configured, skipping a transmission of an RRC resume request for the access control; and
   in case that the RRC connection delay is not configured, transmitting, to a base station, the RRC resume request message,
   wherein the RRC resume request message includes information on the cause of the RRC connection resume corresponding to the area update.

2. The method of claim 1,
   wherein the information on the cause of the RRC connection resume corresponds to traffic transmission in case that the cause of the RRC connection resume is the traffic transmission.

3. The method of claim 1, further comprising:
receiving random access configuration information for the terminal,
wherein the random access configuration information includes information on a random access procedure and resources for a random access preamble.

4. The method of claim 3, wherein the random access configuration information is based on a specific numerology.

5. A terminal operating in a wireless communication system, the terminal comprising:
a transceiver; and
a controller configured to:
identify that a cause of a radio resource control (RRC) connection resume is an area update in case that the terminal is in an inactive state,
identify whether an RRC connection delay for an access control is configured or not to the terminal in case that the cause of the RRC connection resume is the area update,
in case that the RRC connection delay is configured, skip a transmission of an RRC resume request for the access control, and
in case that the RRC connection delay is not configured, transmit, to a base station via the transceiver, the RRC resume request message,
wherein the RRC resume request message includes information on the cause of the RRC connection resume corresponding to the area update.

6. The terminal of claim 5,
wherein the information on the cause of the RRC connection resume corresponds to traffic transmission in case that the cause of the RRC connection resume is the traffic transmission.

7. The terminal of claim 5,
wherein the controller is further configured to receive random access configuration information for the terminal, and
wherein the random access configuration information includes information on a random access procedure and resources for a random access preamble.

8. The terminal of claim 7, wherein the random access configuration information is based on a specific numerology.

* * * * *